United States Patent
Ha et al.

(10) Patent No.: US 12,248,051 B2
(45) Date of Patent: Mar. 11, 2025

(54) METHOD AND DEVICE FOR PERFORMING UWB RANGING

(71) Applicant: Samsung Electronics Co., Ltd., Gyeonggi-do (KR)

(72) Inventors: Taeyoung Ha, Gyeonggi-do (KR); Mingyu Lee, Gyeonggi-do (KR); Sooyeon Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 342 days.

(21) Appl. No.: 17/837,315

(22) Filed: Jun. 10, 2022

(65) Prior Publication Data
US 2022/0397658 A1 Dec. 15, 2022

(30) Foreign Application Priority Data
Jun. 11, 2021 (KR) .................. 10-2021-0076357

(51) Int. Cl.
| | | |
|---|---|---|
| G01S 13/02 | (2006.01) | |
| H04W 4/12 | (2009.01) | |
| H04W 64/00 | (2009.01) | |
| H04W 72/0446 | (2023.01) | |
| H04W 74/08 | (2024.01) | |
| H04W 74/0816 | (2024.01) | |

(52) U.S. Cl.
CPC .......... *G01S 13/0209* (2013.01); *H04W 4/12* (2013.01); *H04W 64/00* (2013.01); *H04W 72/0446* (2013.01); *H04W 74/0816* (2013.01); *H04W 74/0866* (2013.01)

(58) Field of Classification Search
None
See application file for complete search history.

(56) References Cited

U.S. PATENT DOCUMENTS

| | | |
|---|---|---|
| 2018/0267162 A1 | 9/2018 | Olson et al. |
| 2020/0150261 A1 | 5/2020 | Naguib et al. |
| 2020/0182996 A1 | 6/2020 | Lee et al. |
| 2020/0183000 A1* | 6/2020 | Li .................. H04W 4/023 |
| 2020/0200862 A1* | 6/2020 | Li .................. G01S 13/74 |
| 2020/0225341 A1* | 7/2020 | Li .................. H04W 72/0446 |
| 2021/0072373 A1* | 3/2021 | Schoenberg ...... G01S 13/878 |

FOREIGN PATENT DOCUMENTS

WO WO 2021/063549 4/2021

OTHER PUBLICATIONS

International Search Report dated Sep. 6, 2022 issued in counterpart application No. PCT/KR2022/008258, 8 pages.
European Search Report dated Sep. 10, 2024 issued in counterpart application No. 22820622.3-1215, 8 pages.

* cited by examiner

*Primary Examiner* — Adolf Dsouza
(74) *Attorney, Agent, or Firm* — The Farrell Law Firm, P.C.

(57) ABSTRACT

Methods are provided for ultra-wideband (UWB) ranging based on contention-based multiple access. A method performed by a first UWB device includes transmitting an initiation message for initiating UWB ranging, receiving an access message from a second UWB device within a contention period, transmitting a first reply message (RM), receiving a second RM corresponding to the first RM from the second UWB device, and transmitting a final message.

20 Claims, 15 Drawing Sheets

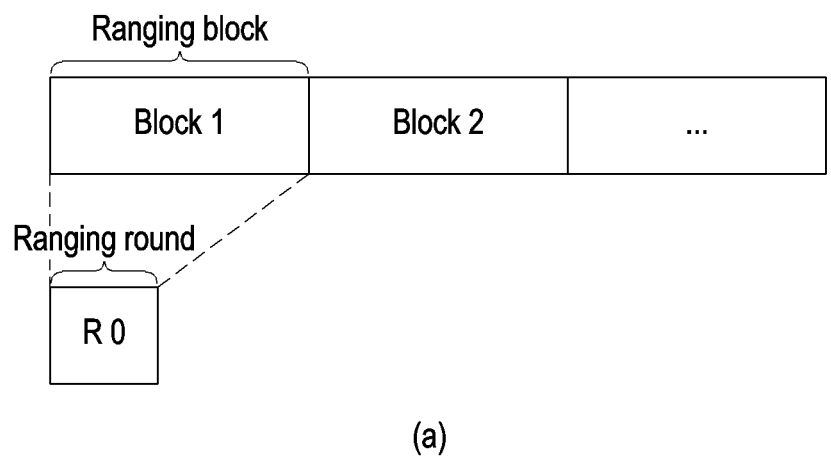
(a)
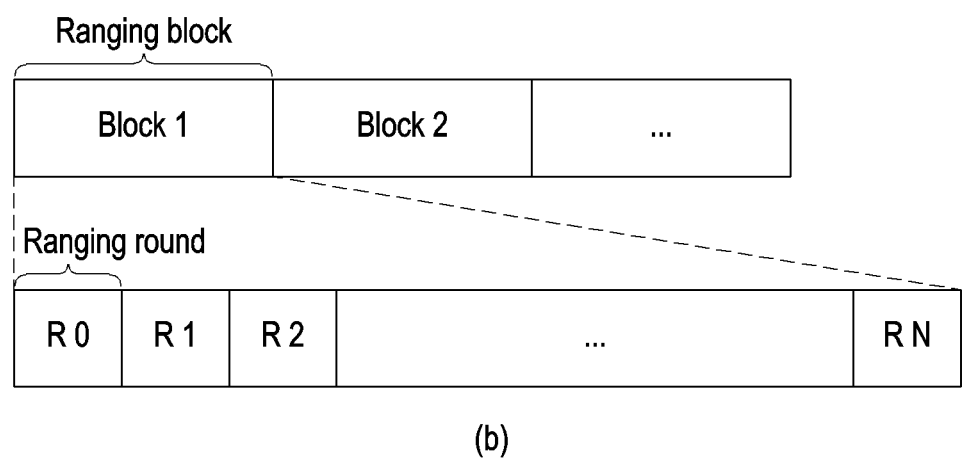
(b)
FIG. 7A

| Field name | Description |
|---|---|
| Contention period | Length of contention period |
| Access condition list | List of access conditions for each slot in contention period<br>- Case 1 (Bitmask): Expressed as access condition bitmask<br>ex) 0b1100<br>- Case 2 (Level): Expressed as access condition level<br>ex)<br>0x00: No access condition restriction<br>0x01: Access condition level 1<br>E.g., accessible by devices within 20cm<br>0x02: Access condition level 2<br>E.g., accessible by devices within 10cm<br>- Case 3 (Value): Expressed as access condition value<br>ex)<br>0x00: No access condition restriction<br>0x0A: Accessible by devices within 10cm<br>0x14: Accessible by devices within 20cm |

FIG. 10

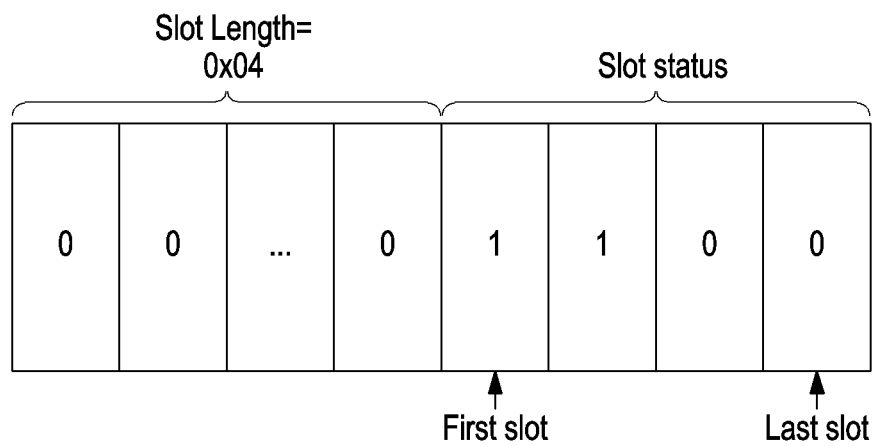

FIG. 11

| Field name | Description | Value |
|---|---|---|
| Contention period | Length of contention period | 0x05 |
| Access condition list | List of access conditions for each slot in contention period | {0x00, 0x00, 0x00, 0x00, 0x00} |

FIG. 12A

| Field name | Description | Value |
|---|---|---|
| Contention period | Length of contention period | 0x0A |
| Access condition list | List of access conditions for each slot in contention period<br><br>0x00: level 0, no access restriction<br>0x01: level 1, accessible by only devices having attempted access two times<br>0x02: level 2, accessible by only devices having attempted access five times | {0x02, 0x02, 0x02, 0x01, 0x01, 0x00, 0x00, 0x00, 0x00, 0x00} |

FIG. 12B

| Field name | Description | Value |
|---|---|---|
| Contention period | Length of contention period | 0x05 |
| Access condition list | List of access conditions for each slot in contention period | {0x00, 0x00, 0x00, 0x00, 0x00} |

FIG. 13A

| Field name | Description | Value |
|---|---|---|
| Contention period | Length of contention period | 0x05 |
| Access condition list | List of access conditions for each slot in contention period<br><br>0x00: No access restriction<br>0x32: Accessible by only devices for which distance from device sending message may be specified as within 50cm<br>0x1E: Accessible by only devices for which distance from device sending message may be specified as within 30cm<br>0x0A: Accessible by only devices for which distance from device sending message may be specified as within 10cm | {0x0A, 0x0A, 0x1E, 0x1E. 0x32} |

FIG. 13B

METHOD AND DEVICE FOR PERFORMING UWB RANGING

CROSS-REFERENCE TO RELATED APPLICATION(S)

This application is based on and claims priority under 35 U.S.C. § 119 to Korean Patent Application No. 10-2021-0076357, which was filed in the Korean Intellectual Property Office on Jun. 11, 2021, the entire disclosure of which is incorporated herein by reference.

BACKGROUND

1. Field

The disclosure relates generally to ultra-wide band (UWB) communication and, more specifically, to a method and device for UWB ranging.

2. Description of Related Art

The Internet is evolving from a human-centered connection network in which humans create and consume information to an Internet of things (IoT) in which information is exchanged and processed between distributed components, i.e., things. Internet of everything (IoE) technology is also emerging and is a combination of a big data processing technology based on a connection to a cloud server and the IoT technology. To implement technology elements such as sensing technology, wired/wireless communication and network infrastructure, service interface technology, and security technology may be utilized. Recently, technologies such as a sensor network, machine to machine (M2M), and machine type communication (MTC) have been studied for connection between distributed components.

In an IoT environment, an intelligent Internet technology (IT) service that collects and analyzes data generated from connected components may be provided.

IoT may be utilized in smart homes, smart buildings, smart cities, smart cars or connected cars, smart grids, healthcare, smart home appliances, advanced medical services, etc., through convergence and merging between the existing information technology and various industries.

As various services may be provided with the development of wireless communication systems, methods of effectively providing these services are required. For example, ranging techniques for measuring a distance between electronic devices by using UWB may be used.

SUMMARY

The disclosure has been made to address at least the above-mentioned problems and/or disadvantages and to provide at least the advantages described below.

Accordingly, an aspect of the disclosure is to provide a method for supporting contention-based multiple access.

Another aspect of the disclosure is to provide a method for adaptively adjusting a contention period and access condition for contention-based multiple access.

Another aspect of the disclosure is to provide a method for providing bi-directional ranging.

In accordance with an aspect of the disclosure, a method is provided for a first UWB device. The method includes transmitting an initiation message (IM) for initiating UWB ranging, receiving an access message (AM) from a second UWB device within a contention period, transmitting a first reply message (RM), receiving a second RM corresponding to the first RM from the second UWB device, and transmitting a final message (FM). The IM may include information about a length of the contention period and information about a state of a ranging slot included in the contention period.

In accordance with an aspect of the disclosure, a method is provided for a second UWB device. The method includes receiving an IM for initiating UWB ranging from a first UWB device, transmitting an AM to the first UWB device within a contention period, receiving a first RM from the first UWB device, transmitting a second RM based on the first RM to the first UWB device, and receiving an FM from the first UWB device. The IM may include information about a length of the contention period and information about a state of a ranging slot included in the contention period.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 7A illustrates ranging blocks according to an embodiment;

FIG. 10 illustrates an IM according to an embodiment;

FIG. 11 illustrates slot status information of an IM according to an embodiment;

FIGS. 12A and 12B illustrate a method for adjusting a length and access condition of a contention period using an IM according to an embodiment;

FIGS. 13A and 13B illustrate a method for adjusting an access condition using an IM according to an embodiment;

DETAILED DESCRIPTION

Figure 1:
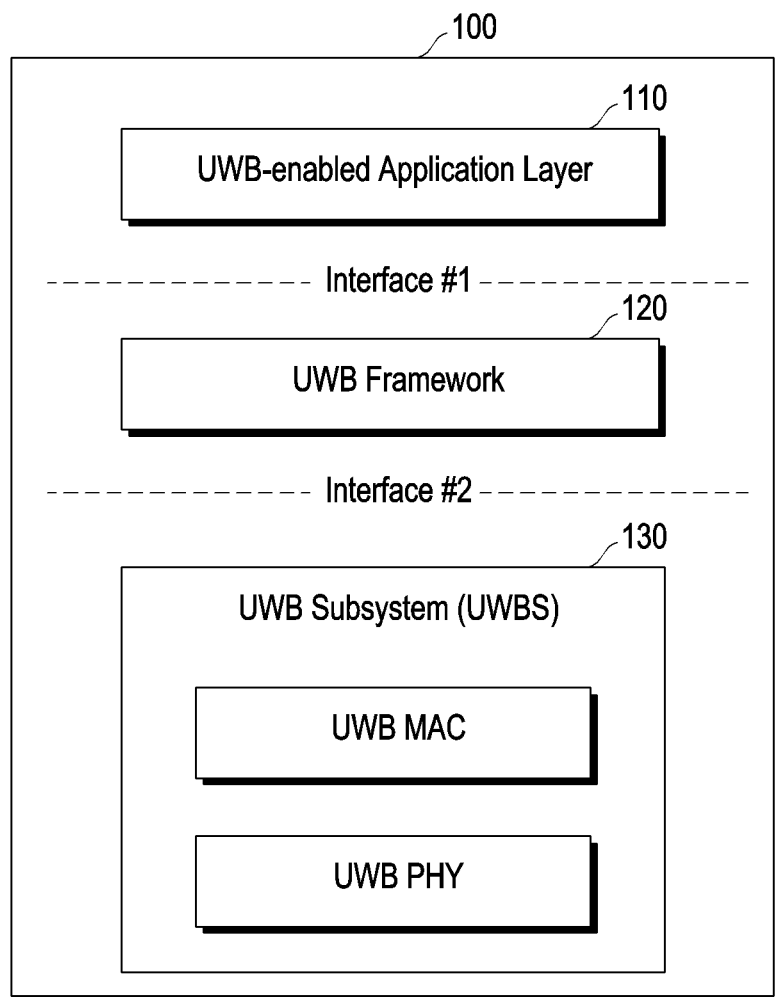
FIG. 1 illustrates a UWB device architecture.

Hereinafter, various embodiments of the disclosure are described in detail with reference to the accompanying drawings.

In describing embodiments, the description of technologies that are known in the art and are not directly related to the disclosure is omitted, in order to avoid obscuring the disclosure with unnecessary detail.

In the drawings, some elements may be exaggerated or schematically shown. Also, the size of each element does not necessarily reflect the real size of the element. The same reference numeral may also be used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure.

Blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, in some replacement execution examples, the functions mentioned in the blocks may occur in different orders. For example, two blocks that are consecutively shown may be performed substantially simultaneously or in a reverse order depending on corresponding functions.

As used herein, the term "unit" includes a software element or a hardware element such as a field-programmable gate array (FPGA) or an application specific integrated circuit (ASIC). However, the term "unit" is not limited to meaning a software or hardware element. A "unit" may be configured in a storage medium that may be addressed or may be configured to reproduce one or more processors. For example, a "unit" may include elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card. A "unit" may include one or more processors.

As used herein, the term "terminal" or "device" may be referred to as a mobile station (MS), a user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, etc.

Examples of a terminal may include a cellular phone, a smart phone with wireless communication capabilities, a personal digital assistant (PDA) with wireless communication capabilities, a wireless modem, a portable computer with wireless communication capabilities, a capturing/recording/shooting/filming device, such as a digital camera, having wireless communication capabilities, a gaming device with wireless communications capabilities, a music storage and playback home appliance with wireless communications capabilities, an Internet home appliance capable of wireless Internet access and browsing, or portable units or terminals incorporating combinations of those capabilities. Further, the terminal may include an M2M terminal and an MTC terminal/device, but is not limited thereto. A terminal may also be referred to as an electronic device or simply as a device.

Although a communication system using UWB is described in connection with embodiments of the disclosure, as an example, embodiments of the disclosure may also be applied to other communication systems with similar technical background or features. For example, a communication system using Bluetooth® or ZigBee® may be included therein. Further, embodiments of the disclosure may be modified in such a range as not to significantly depart from the scope of the disclosure under the determination by one of ordinary skill in the art and such modifications may be applicable to other communication systems.

In general, wireless sensor network technology is divided into a wireless local area network (WLAN) technology and a wireless personal area network (WPAN) technology according to the recognition distance. WLAN is a technology based on the Institute of Electrical and Electronics Engineers (IEEE) 802.11 which allows access to a backbone network within a radius of about 100 m. WPAN is a technology based on IEEE 802.15 which includes Bluetooth®, ZigBee®, and UWB. A wireless network in which such a wireless network technology is implemented may include a plurality of electronic devices.

UWB may refer to a short-range, high-rate wireless communication technology using a wide frequency band of several GHz or more, low spectral density, and short pulse width (e.g., 1 nsec to 4 nsec) in a baseband state. UWB may refer to a band itself to which UWB communication is applied. UWB may allow secure and accurate ranging between devices. Thus, UWB allows relative location estimation based on the distance between two devices or accurate location estimation of a device based on the distance from fixed devices (whose locations are known).

The terminology used herein is provided for a better understanding of the disclosure, and changes may be made thereto without departing from the technical spirit of the disclosure.

Some definitions of commonly used terms are provided as follows:

Application dedicated file (ADF): a data structure in an application data structure that may host an application or application specific data.

Application protocol data unit (APDU): a command and a response used when communicating with the application data structure in the UWB device.

Application specific data: a file structure having a root level and an application level including UWB controllee information and UWB session data for a UWB session.

Controller: a ranging device that defines and controls ranging control messages (RCMs) (or control messages). The controller may define and control ranging features by sending the control message.

Controlee: a ranging device using a ranging parameter in the RCM (or control message) received from the controller. The controlee may utilize the ranging features as configured via the control message from the controller.

Dynamic scrambled timestamp sequence (STS) mode: an operation mode in which the STS is not repeated during a ranging session. In this mode, the STS may be managed by the ranging device, and the ranging session key that generates STS may be managed by a secure component.

Applet: a small application executed on a secure component including UWB parameters and service data. For example, an Applet may be an FiRa Applet.

Ranging device: a device capable of performing UWB ranging. For example, a ranging device may include ate enhanced ranging device (ERDEV) defined in IEEE 802.15.4z or an FiRa Device. The ranging device may also be referred to as a UWB device.

UWB-enabled application: an application for a UWB service. For example, the UWB-enabled application may include an application using a framework application programming interface (API) for configuring an out-of-band (OOB) connector, a secure service, and/or a UWB service for a UWB session. UWB-enabled application may be referred to as an application or a UWB application. For example, a UWB-enabled application may be an FiRa-enabled application.

Framework: a component that provides access to profiles, individual-UWB settings, and/or notifications. Framework may include a collection of logical software components including a profile manager, an OOB connector, a secure service, and/or a UWB service. For example, the framework may be an FiRa framework.

OOB Connector: a software component for establishing an OOB connection (e.g., a Bluetooth® low energy (BLE) connection) between ranging devices. For example, the OOB connector may be an FiRa OOB connector.

Profile: a previously defined set of UWB and OOB configuration parameters. For example, the profile may be an FiRa profile.

Profile manager: a software component that implements a profile available on a ranging device. For example, the profile manager may be an FiRa profile manager.

Service: an implementation of a use case that provides a service to an end-user.

Smart ranging device: a ranging device that may implement an optional framework API. For example, the smart ranging device may be an FiRa Smart Device.

Global dedicated file (GDF): a root level of application specific data including data for establishing a USB session.

Framework API: an API used by a UWB-enabled application to communicate with the framework.

Initiator: a ranging device that initiates a ranging exchange. The initiator may initiate the ranging exchange by sending a first ranging frame (RFRAME) (i.e., a ranging initiation message).

Object identifier (OID): an identifier of the ADF in the application data structure.

OOB: data communication that does not use a UWB as an underlying wireless technology.

Ranging data set (RDS): data (e.g., a UWB session key, a session ID, etc.) for establishing a UWB session while protecting confidentiality, authenticity and integrity.

Responder: a ranging device that responds to an initiator in a ranging exchange. The responder may respond to the ranging initiation message received from the initiator.

STS: a ciphered sequence for increasing the integrity and accuracy of ranging measurement timestamps. The STS may be generated from the ranging session key.

Secure channel: a data channel that prevents overhearing and tampering.

Secure component: an entity (e.g., a secure element (SE) or a trusted execution environment (TEE) having a defined security level that interfaces with UWBS for the purpose of providing an RDS to a UWB subsystem (UWBS), e.g., when dynamic STS is used.

SE: a tamper-resistant secure hardware component that may be used as a secure component in the ranging device.

Secure ranging: ranging based on an STS generated through a strong encryption operation.

Secure service: a software component for interfacing with a secure component, such as a secure element or a TEE.

Service applet: an applet on a secure component that handles service specific transactions.

Service data: data defined by a service provider to be transferred between two ranging devices to implement a service.

Service provider: an entity that defines and provides hardware and software required to provide a specific service to an end-user.

Static STS mode: an operation mode in which an STS is repeated during a session, and does not need to be managed by the secure component.

Secure UWB service (SUS) applet: an applet on an SE that communicates with an applet to retrieve data for secure UWB sessions with other ranging devices. The SUS Applet may transfer corresponding data (information) to the UWBS.

UWB service: a software component that provides access to the UWBS.

UWB Session: a period from when a controller and a control lee start communication through UWB until the communication stops. A UWB Session may include ranging, data transfer, or both ranging and data transfer.

UWB session ID: an ID (e.g., a 32-bit integer) that identifies the UWB Session, shared between the controller and the controller.

UWB session key: a key used to protect a UWB session. The UWB session key may be used to generate the STS. The UWB session key may be a UWB ranging session key (URSK), and may be abbreviated as a session key.

UWBS: a hardware component implementing the UWB physical (PHY) and media access control (MAC) specifications. UWBS may have an interface to a framework and an interface to a secure component to search for an RDS.

Time-scheduled mode (scheduled mode or Time-scheduled ranging): The time-scheduled ranging may be used for a ranging round, where the controlees are scheduled by the controller to transmit RFRAMEs/measurement reports in different ranging slots.

Contention-based mode (Contention-based ranging): The contention-based ranging may be used when the controller does not know the MAC address of the controlees that will participate in a UWB Session. The contention-based ranging allows a controller which is also the initiator to discover and range with unknown UWB devices. In such a mode, the controller may be the initiator and the controlees may be responders.

The contention-based ranging may be used for a ranging round where the controller decides and notifies the contention period size in the control message. In this mode, each responder may select one ranging slot randomly within the contention period for transmitting its ranging response message (contention-based access). In the disclosure, the contention period may be referred to as a contention access period (CAP).

FIG. 1 illustrates a UWB device architecture.

Referring to FIG. 1, a UWB device (e.g., an electronic device) 100 may be a ranging device supporting UWB ranging (e.g., UWB secure ranging). The ranging device may be an ERDEV defined in IEEE 802.15.4z or an FiRa Device.

The UWB device 100 may interact with other UWB devices through a UWB session.

The UWB device 100 may implement a first interface (Interface #1) between the UWB-enabled application 110 and the framework 120, and the first interface allows the UWB-enabled application 110 on the UWB device 100 to use the UWB capabilities of the UWB device 100 in a predetermined manner. The first interface may be a framework API or a proprietary interface, but is not limited thereto.

The UWB device 100 may implement a second interface (Interface #2) between the framework 120 and a UWBS 130. The second interface may be a UWB command interface (UCI) or a proprietary interface, but is not limited thereto.

The UWB device 100 includes a UWB-enabled application 110, a framework 120, and a UWBS 130 including a UWB MAC layer and a UWB PHY layer. Alternatively, some of the illustrated entities may not be included in the UWB device 100, or additional entities (e.g., a security layer) may be further included.

The UWB-enabled application 110 may trigger establishment of a UWB session by UWBS 130 through the first interface. The UWB-enabled application 110 may use one of previously defined profiles (profile). For example, the UWB-enabled application 110 may use one of the profiles defined in FiRa or a custom profile. The UWB-enabled application 110 may use the first interface to handle related events, such as service discovery, ranging notifications, and/or error conditions.

The framework 120 may provide access to profiles, individual-UWB settings, and/or notifications. The framework 120 may be a set of software components.

As described above, the UWB-enabled application 110 may interface with the framework 120 through the first interface, and the framework 120 may interface with the UWBS 130 through the second interface. Software components of the framework 120 may include a profile manager, an OOB connector, a secure service, and/or a UWB service.

The profile manager may serve to manage profiles available on the UWB device 100. A profile may include a set of parameters for establishing communication between UWB devices 100. For example, a profile may include a parameter indicating which an OOB secure channel is used, a UWB/OOB configuration parameter, a parameter indicating whether the use of a particular secure component is mandatory, and/or a parameter related to the file structure of the ADF.

The OOB connector may play a role to establish OOB connection between UWB devices. The OOB connector may handle an OOB step including a discovery step and a connection step.

The secure service may play a role of interfacing with a secure component, such as an SE or a TEE.

The UWB Service may perform a role in managing a UWBS 130. A UWB service may provide access to a UWBS 130 from a profile manager by implementing the second interface.

The UWBS 130 may be a hardware component including a UWB MAC layer and a UWB PHY layer. The UWBS 130 may perform UWB session management and may communicate with the UWBS of another UWB device. The UWBS 130 may interface with the Framework 120 through the second interface and may obtain the RDS from the Secure Component.

Figure 2:
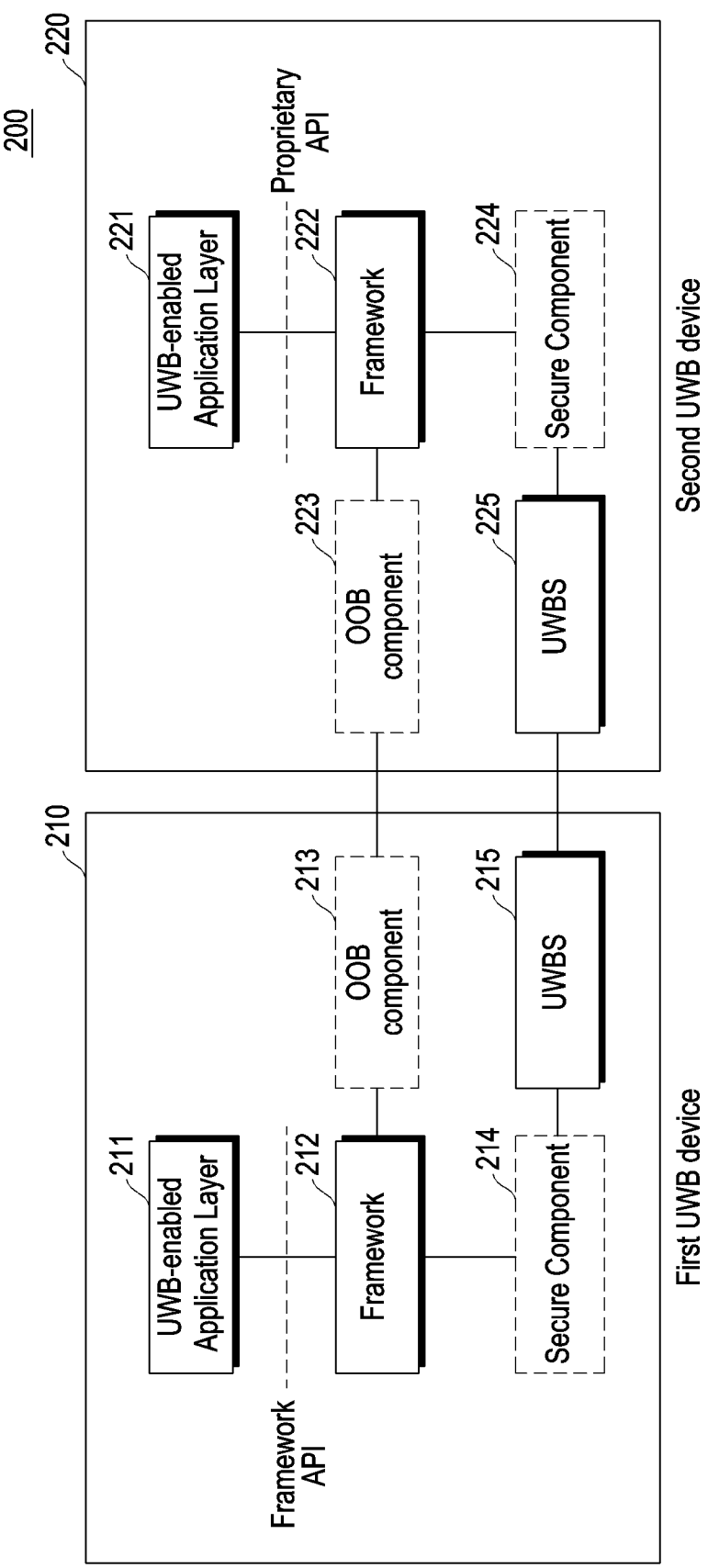
FIG. 2 illustrates a communication system including UWB devices.

FIG. 2 illustrates a communication system including a UWB device.

Referring to FIG. 2, the communication system 200 includes a first UWB device 210 and a second UWB device 220. The first UWB device 210 and the second UWB device 220 may be configured like the UWB device 100 of FIG. 1 or may be an electronic device including the UWB device 100 of FIG. 1.

The first UWB 210 may host one or more UWB-enabled applications, which may be installed by the user (e.g., a mobile phone), e.g., based on a framework API. The second UWB 220 does not provide a framework API, and may use a proprietary interface to implement a specific UWB-enabled application. Alternatively, both the first UWB device 210 and the second UWB device 220 may be ranging devices using the framework API, or both the first UWB device 210 and the second UWB device 220 may be ranging devices using the proprietary interface.

The first UWB device 210 includes a UWB-enabled application layer 211, a framework 212, an OOB component 213, a secure component 214, and a UWBS 215. The second UWB device 220 includes a UWB-enabled application layer 221, a framework 222, an OOB component 223, a secure component 224, and a UWBS 225. The OOB components 213 and 223 and/or the secure components 214 and 224 may be optional components and, according to an embodiment, may be omitted from the UWB devices 210 and 220.

The frameworks 212 and 222 may provide access to profiles, individual-UWB settings, and/or notifications. The frameworks 212 and 222 may include a set of software components, e.g., a profile manager, an OOB connector, a secure service, and/or a UWB service.

The OOB components 213 and 223 may be hardware components including a MAC layer and/or a physical layer for OOB communication (e.g., BLE communication). The OOB components 213 and 223 may communicate with OOB components of other devices. The first UWB device 210 and the second UWB device 220 may create an OOB connection (channel) using the OOB components 213 and 223 and exchange parameters for establishing a UWB session through the OOB channel. The OOB components 213 and 223 may be referred to as OOB subsystems.

The UWBSs 215 and 225 may be hardware components including a UWB MAC layer and a UWB PHY layer. The UWBSs 215 and 225 may perform UWB session management and may communicate with the UWBS of another UWB device. The first UWB device 210 and the second UWB device 220 may exchange service data and perform UWB ranging through the UWB session established through the UWBSs 215 and 225 using the exchanged parameters.

The secure components 214 and 224 may be hardware components that interface with the frameworks 212 and 222 and/or UWBSs 215 and 225 to provide an RDS.

The UWB-enabled application layers 211 and 221 and/or the frameworks 212 and 222 may be implemented by an application processor (AP) (or processor). Accordingly, operations of the UWB-enabled application layers 211 and 221 and/or the frameworks 212 and 222 are performed by an AP.

Figure 3A:
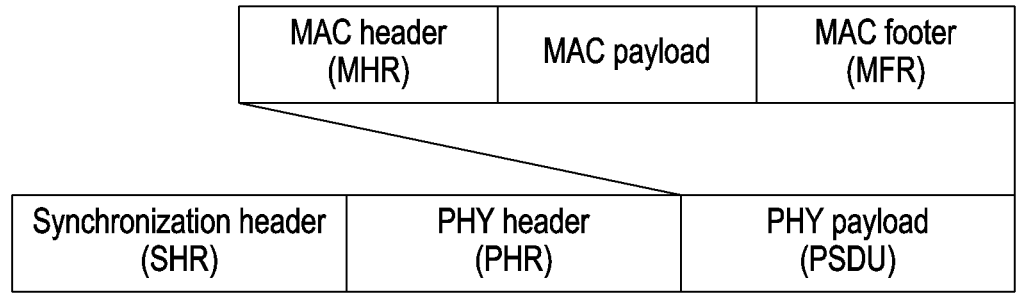
FIGS. 3A and 3B illustrate UWB communication frames.
Figure 3B:
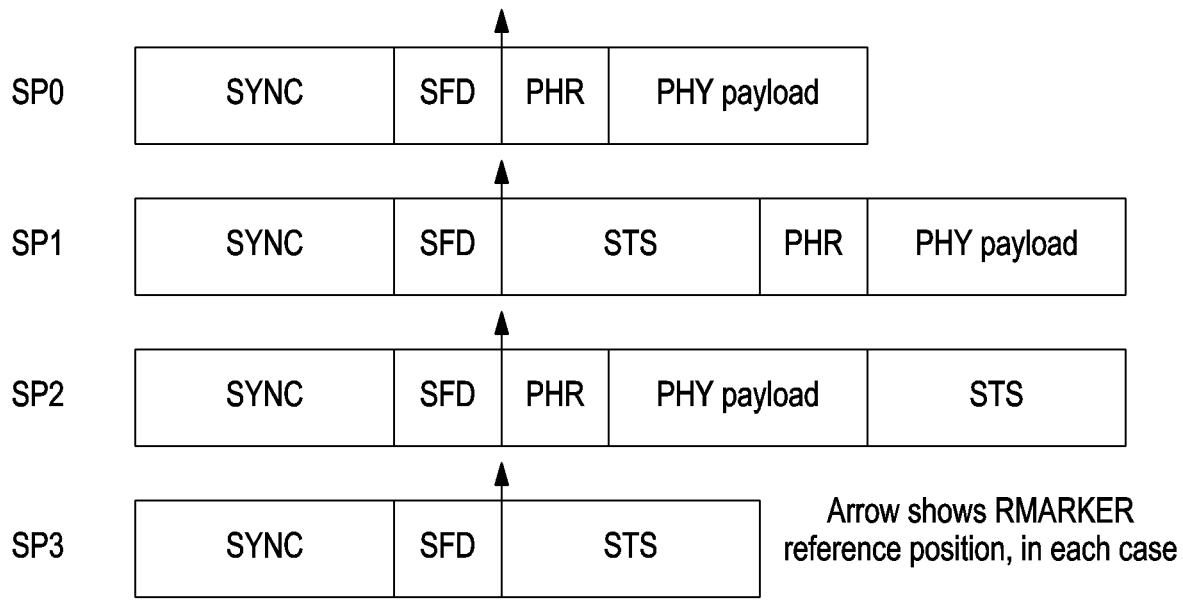

FIGS. 3A and 3B illustrate UWB communication frames.

More specifically, FIG. 3A illustrates a frame to which an STS packet configuration is not applied, and FIG. 3B illustrates a frame to which an STS packet configuration is applied. The frame may be an RFRAME for transferring ranging data (e.g., ranging initiation/reply/final message, etc.) or a data frame for transferring other data (e.g., service data, etc.).

Referring to FIG. 3A, the frame or a PHY PDU (PPDU) for transferring the frame may include a synchronization header (SHR), a PHY header (PHR), and a PHY service data unit (PSDU). The PSDU may include a MAC frame. The MAC frame may include a MAC header (MHR), a MAC payload, and/or a MAC footer (MFR). The synchronization header of the PPDU may include a synchronization (SYNC) field and a start-of-frame delimiter (SFD). The SFD field may indicate the end of the SHR and the start of the data field.

The PHY layer of the UWB device may include an optional mode to provide a reduced on-air time for high density/low power operation. In this case, the frame may include an encrypted sequence (i.e., STS) to increase the integrity and accuracy of the ranging measurement timestamp. The STS may be used for security ranging.

Referring to FIG. 3B, in the case of STS packet (SP) setting 0 (SP0), the STS field is not included in the PPDU (SP0 packet). In the case of SP setting 1 (SP1), the STS field is positioned immediately after the start of frame delimiter (SFD) field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In the case of SP3, the frame (or UWB message) does not include the PHR and PHY payload.

SP0, SP1, and SP3 may be settings that must be supported when the STS packet setting is supported, and SP2 may be an optionally supported setting.

Figure 4:
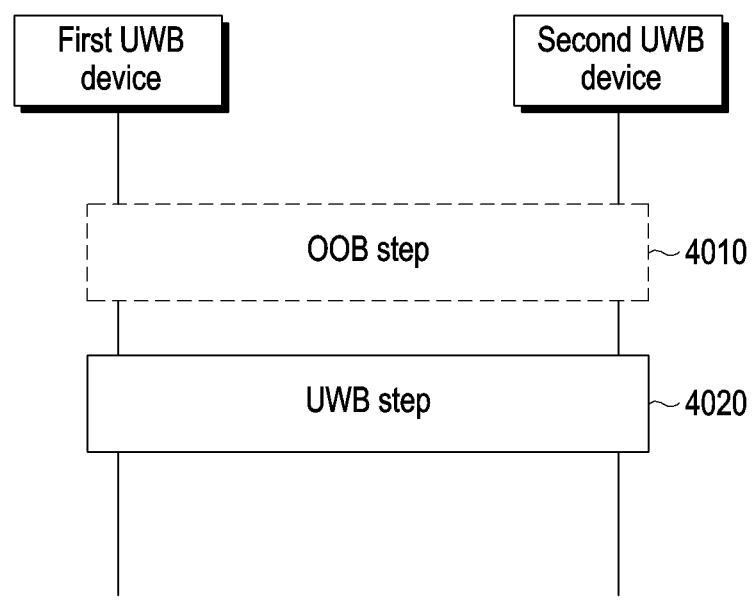
FIG. 4 illustrates a method for performing UWB communication by two UWB devices.

FIG. 4 illustrates a method for performing UWB communication by two UWB devices.

Referring to FIG. 4, a first UWB device may play a role as a controller (or controllee), and a second UWB device may play a role as a controllee (or controller), which is the role opposite to the role of the first UWB device. The first UWB device may play a role as an initiator (or responder), and the second UWB device may play a role as a responder (or initiator), which is the role opposite to the role of the first UWB device.

In step 4010, the first UWB device and the second UWB device may perform an OOB step (phase) before the UWB step (phase). The OOB step may be referred to as an OOB connection step.

The OOB step may be performed to discover UWB devices through the OOB channel (e.g., a BLE channel) and to establish and control a UWB session.

The OOB step may include at least one of the following steps:
  discovering UWB devices and profiles (device and profile discovery)
  establishing an OOB connection (channel)
  establishing a secure channel to secure messages and data
  exchanging parameters for establishing a UWB session through the secure channel (e.g., UWB capability parameters (controllee capability parameters), UWB configuration parameters and/or session key-related parameters) (parameter exchange step)

The parameter exchange step may include the controllee transferring controllee capability parameters/messages (UWB_CAPABILITY) to the controller, the controller transferring UWB configuration parameters/messages (UWB_CONFIGURATION) to the controllee, and/or one UWB device transferring session key-related parameters/messages (SESSION_KEY_INFO) for protecting the UWB session to the other UWB device.

The controllee (UWB) capability parameter and/or session key parameter may be included and transmitted in the controllee information message (CONTROLLEE_INFO), which is the OOB message transferred from the controllee to the controller. The UWB configuration parameter and/or session key parameter may be included and transmitted in the session data message (SESSION_DATA), which is the OOB message transferred from the controller to the controllee.

The controllee performance parameter (UWB_CAPABILITY) may include at least one parameter that provides information about the device capability of the controllee. For example, the controller performance parameter may include a parameter for supporting the role of the device (initiator or responder), a parameter for multi-node support, a parameter for supporting STS configuration, a parameter for supporting a ranging method, an RFRAME feature performance parameter, a parameter for supporting angle of arrival (AoA), and/or a parameter for supporting a scheduled mode.

The UWB configuration parameter (UWB_CONFIGURATION) may include at least one parameter used for configuration of a UWB session. For example, UWB configuration parameters may include a UWB session ID parameter, a ranging method parameter, a multi-node configuration parameter, an STS configuration parameter, a scheduled mode parameter, a time-of-flight (ToF) report parameter, an AoA-related parameter, a parameter indicating the number of slots per ranging round, a slot duration parameter, a responder slot index parameter, a MAC address mode parameter, a device MAC address parameter, a parameter indicating the number of controllees, and/or a destination (DST) MAC address parameter.

The session key-related parameter (SESSION_KEY_INFO) may include a session key-related parameter for dynamic STS and/or a session key-related parameter for static STS. For example, the session key-related parameter for dynamic STS may include data exchanged to generate a UWB session key or data directly used as a USB session key. For example, the static STS may include an ID of a vendor (Vendor ID) that is a provider of the UWB-enabled application and any pre-defined value (static STS IV) selected by the UWB-enabled application for the UWB device. The vendor ID may be used to set the phyVupper64 parameter for a static STS, and the static STS IV may be used to set the vUpper64 parameter.

In step 4020, the first UWB device and the second UWB device may perform a UWB step. The UWB step may be referred to as an UWB connection step.

The UWB step may be performed to perform UWB ranging through the UWB session and transfer service data.

The UWB step may include at least one of the following steps:
  Starting a UWB session (e.g., a UWB trigger)
  Performing UWB ranging to obtain the distance/location between two UWB devices Exchanging service data (transaction)

As described above, the OOB step is an optional step and may be omitted in some embodiments. For example, when discovery of a UWB device and/or establishment and control of a UWB session are performed through a UWB channel (in-band), the OOB step may be omitted. When in-hand discovery is performed, the OOB step of performing OOB discovery may be omitted. In this case, the UWB step may further perform an operation for discovering a UWB device through the UWB channel and exchanging parameters for UWB session configuration.

Figure 5A:
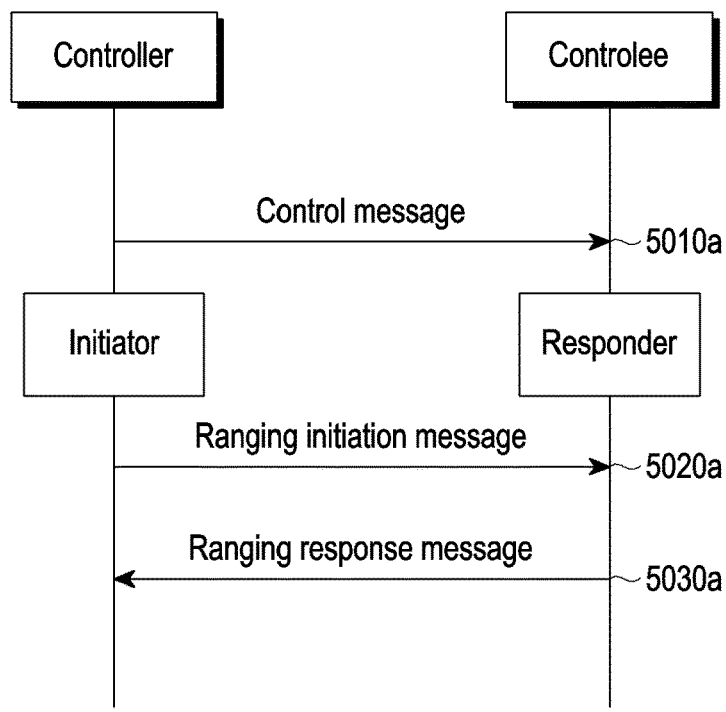
FIGS. 5A and 5B illustrate methods for performing UWB ranging by two UWB devices.
Figure 5B:
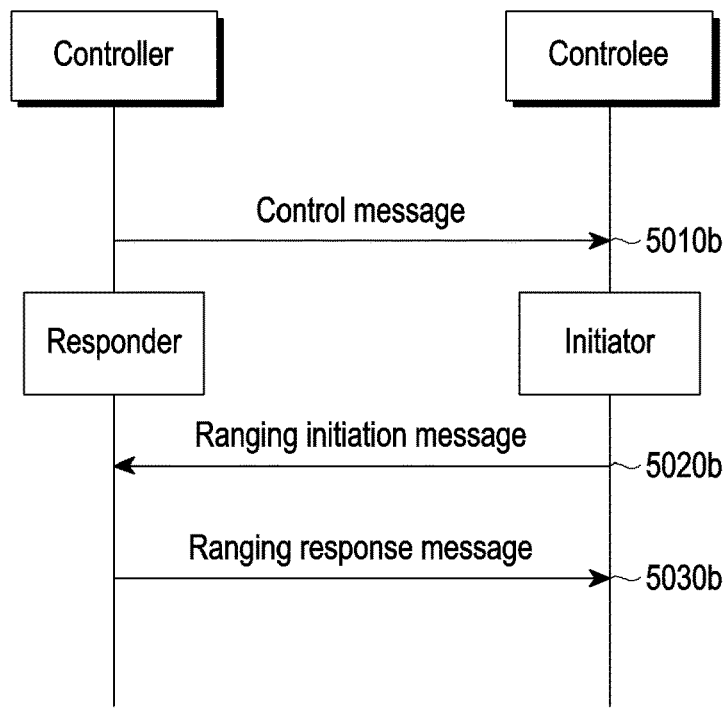

FIGS. 5A and 5B illustrate methods for performing UWB ranging by two UWB devices.

More specifically, FIG. 5A illustrates the first UWB device operating as the controller/initiator, and the second UWB device operating as the controllee/responder, and FIG. 5B illustrates the first UWB device operating as the controller/responder, and the second UWB device operating as the control lee/initiator.

Referring to FIGS. 5A and 5B, in steps 5010a and 5010b, the controller may transmit a control message for UWB ranging to the controllee. The RCM may be used to carry ranging parameter(s) for controlling and configuring a ranging procedure. The control message may include information about the role (e.g., initiator or responder) of the ranging device, ranging slot index information, and/or address information about the ranging device.

In steps 5020a and 5020b, the initiator may transmit a ranging initiation message for initiating UWB ranging to the responder. The initiators may transmit a ranging initiation message through an SP1 packet or an SP3 packet. When the ranging initiation message is transmitted through the SP1 packet, the control message may be included and transmitted in the PHY payload of the ranging initiation message. When the ranging initiation message is transmitted through the SP3 packet, the ranging initiation message does not include the PHR and PHY payloads.

In steps 5030a and 5030b, the responder may transmit a ranging reply message to the initiator in response to the ranging initiation message. The responders may transmit a ranging reply message through an SP1 packet or an SP3 packet. When the ranging reply message is transmitted through the SP1 packet, a first measurement report message may be included and transmitted in the PHY payload of the ranging reply message. The first measurement report message may include an AoA measurement, a reply time measured by the responder, and/or a list of round-trip time measurements for responders and responder addresses. The reply time field may indicate a time difference between the reception time of the ranging initiation message and the transmission time of the ranging reply message at the responder side. Based on this, single-sided two-way ranging (SS-TWR) may be performed. ToF calculation through SS-TWR follows the scheme defined in IEEE 802.15.4z.

For double-sided two-way ranging (DS-TWR), the initiators may further transmit a ranging final message to the responders to complete the ranging exchange. When the ranging final message is transmitted through the SP1 packet, a second measurement report message may be included and transmitted in the PHY payload of the ranging final message. The second measurement report message may include an AAA measurement, the round-trip time for the first responder (first round-trip time), and/or a list of reply time measurements for responders and responder addresses. When the sender of the measurement report message is the initiator, the first round-trip time field may indicate a time difference between the ranging initiation message from the initiator and the first ranging reply message from the first responder. Alternatively, when the sender of the measurement report message is the responder, the first round-trip time field may indicate a time difference between the ranging reply message from the responder and the ranging final message from the initiator. Based on this, DS-TWR may be performed. A ToF calculation through DS-TWR follows the scheme defined in IEEE 807.15.4z.

Alternatively, the above-described first measurement report message and/or second measurement report message may be omitted from the ranging reply message and/or the ranging final message, and may be transmitted as separate messages. For example, the measurement report message may be transmitted through the data frame after the ranging exchange.

The initiator and responder may perform UWB ranging according to a preset schedule mode. For example, in the time-scheduled ranging mode, the controller may know the IDs of all control lees and may designate an accurate schedule of ranging transmission. As another example, in the contention-based ranging mode, the controller does not know the number and ID of the controllees, and thus, UWB devices compete with each other. In this case, a collision may occur between the responding devices.

Figure 6:
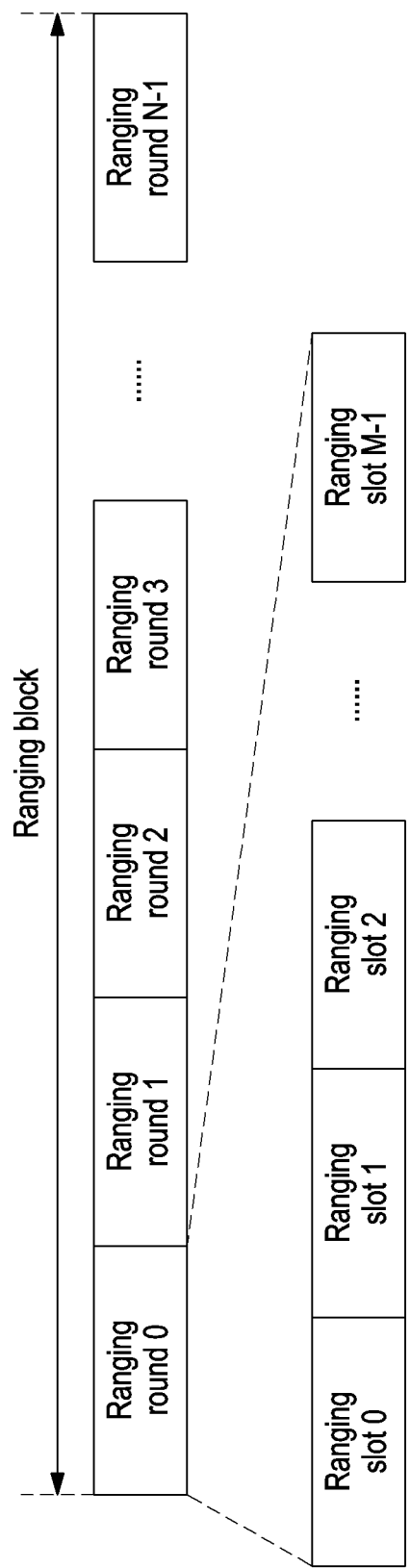
FIG. 6 illustrates a ranging block and a round for UWB ranging.

FIG. 6 illustrates a ranging block and a round for UWB ranging.

Referring to FIG. 6, a ranging block is a time period for ranging. A ranging round is a period of sufficient duration to complete one entire range-measurement cycle involving a set of UWB devices participating in a ranging exchange. The ranging slot may be a sufficient period for transmission of at least one RFRAME (e.g., ranging initiation/reply/final message, etc.).

As illustrated in FIG. 6, one ranging block may include multiple ranging rounds. Each ranging round may include at least one ranging slot.

When the ranging mode is a block-based mode, a mean time between contiguous ranging rounds may be constant. Alternatively, when the ranging mode is an interval-based mode, the time between contiguous ranging rounds may dynamically change. In other words, the interval-based mode may adopt a time structure having an adaptive spacing.

The number and duration of slots included in the ranging round may change between ranging rounds, e.g., through a control message from the controller.

A ranging round may be concisely referred to as a round, a ranging block may be concisely referred to as a block, and a ranging slot may be concisely referred to as a slot.

The UWB system may support multi-node communication (e.g., multi-node ranging). For example, ranging between one initiator and one or more responders (1:N ranging) and/or ranging between one or more initiators and one or more responders (N:N ranging) may be supported. In this case, one or more responders may perform multiple access to the initiator.

When the controller knows information of the controllers (e.g., the number and ID of the controllers) during multiple access, communication based on the controller's scheduling (e.g., ranging according to a time-scheduled ranging mode) may be performed.

However, when the controller cannot know the information of the controllers during multiple access, e.g., in the case of a service in which the initiator operating as the controller should communicate with unspecified responders (e.g., gate system or point of sales (PoS) system service), communication based on the controller's scheduling may not be performed, and contention-based communication (e.g., ranging according to contention-based ranging mode) should be performed. The disclosure proposes a method for supporting such contention-based multiple access (communication).

Further, in the case of DS-TWR based on the ranging initiation message of the initiator, the ranging reply message of the responder, and the ranging final message of the initiator as described above with reference to FIG. 5, only the responder may directly identify the distance from the initiator through the DS-TWR. In other words, the initiator cannot directly identify the distance from the responder through the DS-TWR. In this case, it is difficult for the initiator and the responder to perform the service requiring transaction processing in a trustable situation based on distance. Thus, in accordance with an embodiment of the disclosure, a method is provided in which both the initiator and responder may perform the DS-TWR.

FIG. 7A illustrates a ranging block according to an embodiment.

Referring to FIG. 7A, a ranging block may include at least one round. For example, one block may include one or a plurality of rounds for each provided service.

The ranging blocks of FIG. 7A may have a ranging block structure based on a block based mode. In other words, a ranging block may have a slotted ranging block structure. Accordingly, the mean time between consecutive ranging rounds may be constant.

Referring to structure (a) in FIG. 7A, one ranging block includes one ranging round. The structure (a) may be applied when there is one initiator that provides one UWB service (e.g., PoS service). For example, in the case of a PoS service operating without other UWB services around, the PoS device serves as an initiator, and the ranging block may be configured with one ranging round.

Referring to structure (b) in FIG. 7A, one ranging block includes a plurality of ranging rounds. The structure (b) may be applied when there are a plurality of initiators that provide the same UWB service (e.g., gate service). For example, for a gate service provided by a plurality of gate devices providing the same UWB service, each gate device serves as an initiator, and a ranging block may be configured with a number of ranging rounds corresponding to the number of gate devices or more than the number of the gate devices. In this case, one ranging round may be assigned for each gate device.

When a ranging block is configured with a number of ranging rounds more than the number of gate devices, some ranging rounds may be used for purposes unrelated to a specific gate. For example, some ranging rounds may be used to transmit a time difference of arrival (TDoA) message for estimating the location of the user's UWB device.

Figure 7B:
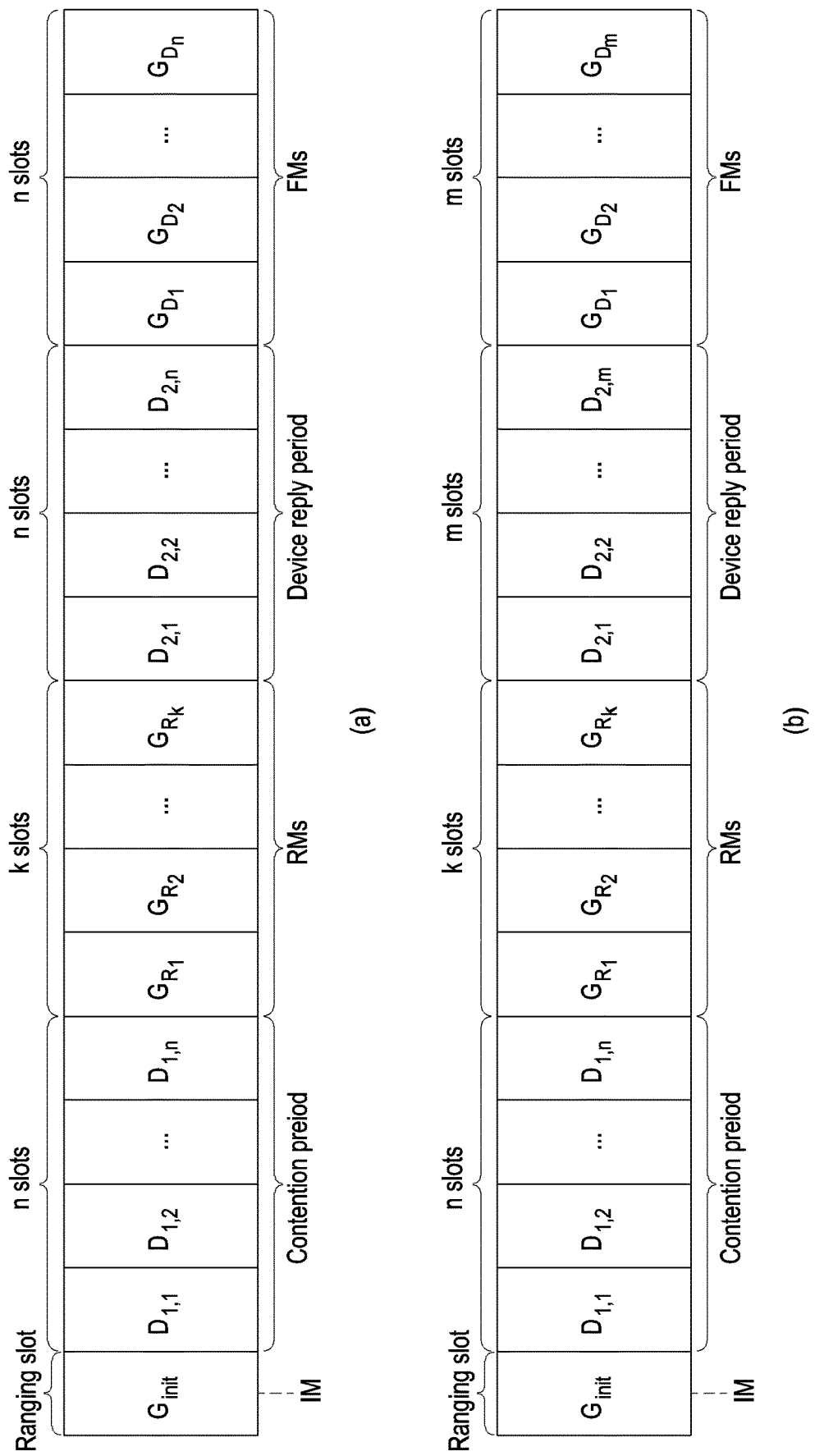
FIG. 7B illustrates ranging rounds according to an embodiment.

FIG. 7B illustrates ranging rounds according to an embodiment. More specifically, the ranging rounds of FIG. 7B correspond to the ranging blocks of FIG. 7A.

Referring to FIG. 7B, one ranging round may include at least one ranging slot. The number of ranging slots included in the ranging round may vary depending on the environment or settings applied.

The embodiment of FIG. 7B relates to a ranging round structure for supporting contention-based multiple access (contention-based ranging). The ranging round structure of FIG. 7B may be a structure that allows the initiator, as well as the responder, to perform DS-TWR.

Referring to structure (a) of FIG. 7B a ranging round structure for supporting contention-based multiple access is provided.

In the structure (a), the ranging round may include an initiation phase in which the initiator transmits an initiation message (IM) to a responder(s), a contention phase in which the responder(s) transmits an access message (AM) (or a device AM (DAM)) to the initiator within a contention period, a first reply phase in which the initiator transmits an reply message (RM) to the AM to the responder(s), a second reply phase in which the responder(s) transmit a device RM (DRM) to the initiator's RM to the initiator, and a final phase in which the initiator transmits an final message (FM) to the responder(s). The FM may be used to transfer service data (e.g., data for payment). Further, an AM and/or a second RM may also be used to transfer service data as needed.

The initiation phase may be referred to as a ranging initiation phase. The contention phase may be referred to as a contention window phase. The first reply phase may be referred to as an initiator reply phase, a gate reply phase, or a PoS reply phase. The second reply phase may be referred to as a responder reply phase, a device reply phase, or a device reply period.

A period of the initiation phase may be referred to as a first period. A period of the contention phase may be referred to as a second period or a contention period. A period of the first reply phase may be referred to as a third period. A period of the second reply phase may be referred to as a fourth period. A period of the final phase may be referred to as a fifth period.

In structure (a), the initiation phase may include one ranging slot. For example, as shown in the structure (a), the initiation phase may include the first ranging slot of the corresponding ranging round.

The contention phase may include a number of ranging slots corresponding to the maximum number (e.g., n) of responders allowed in the corresponding round. For example, to support access by up to n responders in the corresponding round, the number of slots in the contention phase should be set to n. The maximum number of allowed responders (e.g., n) may be less than or equal to the number of candidate responders to participate in the contention or ranging procedure. The number of candidate responders may be identified through an OOB procedure performed prior to a ranging procedure. As shown in the structure (a), ranging slot(s) of the contention phase may start immediately after the ranging slot of the initiation phase.

The first reply phase may include a number of ranging slots corresponding to the number (e.g., k) of anchors of the UWB device operating as the initiator.

Like the contention phase, the second reply phase and the final phase may include a number of ranging slots corresponding to the number (e.g., n) of responders. In other words, the number of ranging slots in the contention phase, the number of ranging slots in the second reply phase, and the number of ranging slots in the final phase may be the same. The total number of ranging slots configured in such a manner may be 3n+k+1.

However, without being limited thereto, the number of ranging slots in some phases or all phases may be adjusted as needed. For example, the initiation phase may include a number of slots corresponding to the number (e.g., k) of anchors of the UWB device operating as the initiator. In this case, each anchor may transmit an IM in each slot of the initiation phase. For example, the contention phase, the second reply phase, and/or the final phase may include a greater number of ranging slots than the number of candidate responders.

In structure (a), the number of slots in the contention phase and the number of slots in the second reply phase/ number of slots in the final phase are the same. Alternatively, a restriction may be imposed so that only responders that have succeeded in contention (or access) transmit a device RM in the second reply phase and, in such a case, the number of slots in the second reply phase and the number of slots in the final phase may be smaller than the number of slots in the contention phase. Thus, the length (or, size) of one round may be reduced.

Structure (b) of FIG. 7B illustrates a ranging round structure for supporting contention-based multiple access.

In the structure (b), like structure (a), the ranging round may include an initiation phase, a contention phase, a first reply phase, a second reply phase, and a final phase. The initiation phase may include one ranging slot, and the contention phase may include a number of ranging slots corresponding to the maximum number (e.g., n) of the responders allowed in the corresponding round. The first reply phase may include a number of ranging slots corresponding to the number (e.g., k) of the anchors of the UWB device operating as the initiator. The maximum number of allowed responders (e.g., n) may be equal to or smaller than the number of candidate responders to participate in the contention or ranging procedure.

However, unlike structure (a), in structure (b), the second reply phase period and the final phase may include a number of ranging slots corresponding to the number (e.g., m) of responders that have succeeded in competition. In this case, the number (e.g., m) of the responders having succeeded in contention is smaller than the total number (e.g., n) of the responders.

The total number of ranging slots configured in such a manner may be n+k+1+2m.

However, without being limited thereto, the number of ranging slots in some phases or all phases may be adjusted as needed. For example, the initiation phase may include a number of slots corresponding to the number (e.g., k) of anchors of the UWB device operating as the initiator. In this case, each anchor may transmit an IM in each slot of the initiation phase. For example, the contention phase may include a greater number of ranging slots than the number of candidate responders.

To impose a restriction so that only responders succeeding in contention transmit a device replay message in the second reply phase, the initiator may provide restriction-related information to the first RM transmitted in the first reply phase. For example, the initiator may include, in the first RM transmitted in the first reply phase, information about the length of the second reply phase (period) (e.g., the number of slots included in the second reply phase) coming after the first reply phase and transmit it.

The above-described ranging round structures of FIG. 7B allow a plurality of responders to perform contention-based multiple access to an initiator within a contention period. The ranging round structures of FIG. 7B may allow the initiator, as well as the responder, to perform DS-TWR. For example, the responder may perform three (3) message-based DS-TWR according to the IM, the AM, and the first RM, and the initiator may perform three (3) message-based DS-TWR according to the AM, the first RM, and the second RM.

Figure 8:
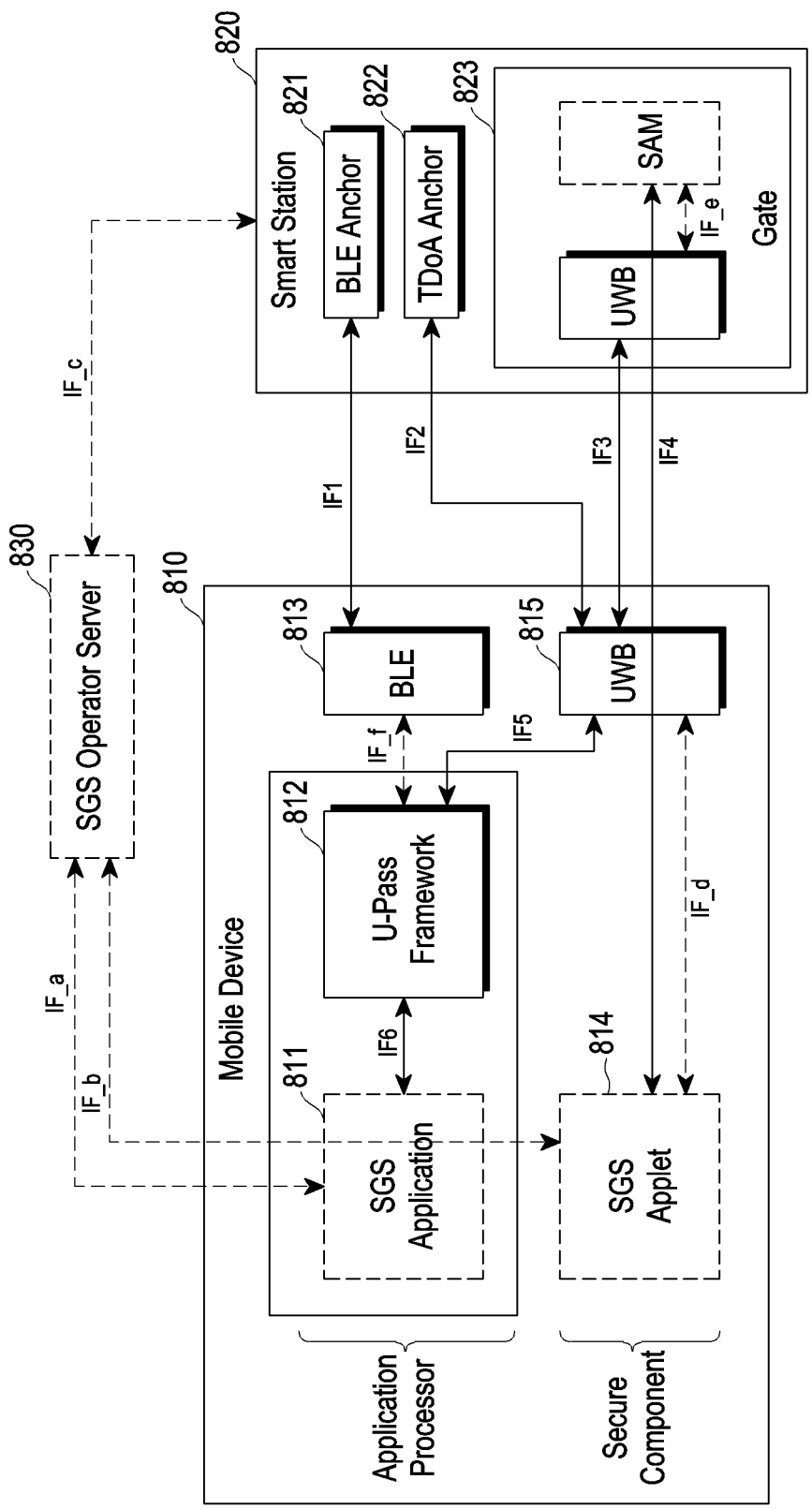
FIG. 8 illustrates a system providing a UWB-based gate service according to an embodiment.

FIG. 8 illustrates a system for providing a UWB-based gate service according to an embodiment.

Herein, the UWB-based gate service may be referred to as a gate service or a smart gate service (SGS), and the system that provides a UWB-based gate service may be referred to as a gate system or a smart gate system.

Referring to FIG. 8, the gate system includes a mobile device 810, a smart station 820, and an SGS operator server 830. The mobile device 810 may be referred to as a first UWB device, and the smart station 820 may be referred to as a second UWB device.

(1) The mobile device 810 may include an SGS application 811, a framework (U-Pass framework) 812, a BLE component (subsystem) 813, an SGS applet 814, and/or a UWB component (subsystem) 815. In an embodiment, the framework, the SGS application 811, the SGS applet 814, the BLE component 813, and/or the UWB component 815 of the mobile device 810 may be examples of the framework, UWB-enabled application, applet, OOB component, and UWB component, respectively, of the UWB device 100 described above in connection with, e.g., FIG. 1.

The framework 812 may support at least one of the following functions:

Estimate the location of the mobile device during the Downlink-TDoA (D-TDoA) round.

Implement procedures for performing UWB ranging and transaction.

Provide a set of APIs for the SOS operator's application (SOS application) and provide an interface between the framework and UWB components.

Trigger UWB communication (component) when BLE advertisement is received from smart station 820.

The SOS application 811 may support at least one of the following functions:

When requested by the framework, provide anchor and UWB block structure deployment information.

Provide the framework with the aid of SGS applets and the version of the SGS applet protocol.

Communication with the SGS operator server to initiate service application installation, station specific information retrieval (e.g., an anchor map), and token retrieval or renewal process.

The SGS applet 814 may support at least one of the following functions:

Hosted on a secure component (e.g., an SE or a TEE) capable of communicating through a UWB interface.

Implement transaction protocol for gate service.

Support APDU command.

The BLE component 813 may be used to receive at least one BLE message from the smart station 820 when the mobile device enters the service area of the gate system.

The UWB component 815 may be used to estimate the location of the mobile device, e.g., by D-TDoA, and/or may be used to communicate with a specific gate to perform UWB ranging and transactions.

(2) The smart station 820 may include at least one BLE anchor 821, at least one TDoA anchor 822, and/or at least one gate (gate device) 823. The TDoA anchor may be a D-TDoA anchor or uplink-TDoA (U-TDoA) anchor.

The BLE anchor 821 may be used to provide general station information about the mobile device 810 and to inform that the mobile devices are entering the service area of the gate system.

The BLE anchor 821 may support a role as a generic access profile (GAP) broadcaster, a role as a generic attribute profile (GATT) server, and/or broadcasting of the advertising physical channel PDU.

The TDoA anchor 822 may be deployed in the service area of the gate system. The D-TDoA anchor 822 may broadcast a UWB message at a specific time. The UWB message may be used by the mobile device 810 to estimate its location.

The gate device 823 may include at least one UWB component (sub-system) and/or a security authentication module. The UWB component may be configured like the UWB subsystem in FIG. 1. The gate arrangement may include at least one anchor, and each anchor may include at least one UWB component.

The UWB component may be used to communicate with the mobile device 810 for gate access and gate ranging, so as to identify whether the mobile device 810 is within a valid range to perform the transaction procedure and pass through the gate.

The UWB component may support at least one of the following features:
Perform DS-TWR
Perform gate connection and gate ranging
Provide an interface to the security authentication module The security authentication module may be used to verify whether the mobile device is authenticated to use the gate system.

The security authentication module may support at least one of the following features:
Provide an interface to the UWB component
Capability of communication through UWB interface
Capability for synchronization with the SGS operator server (3) The SGS operator server 830 may manage the entire gate system. To this end, the SGS operator server 830 may communicate with the mobile device 810 and smart station 820.

Figure 9:
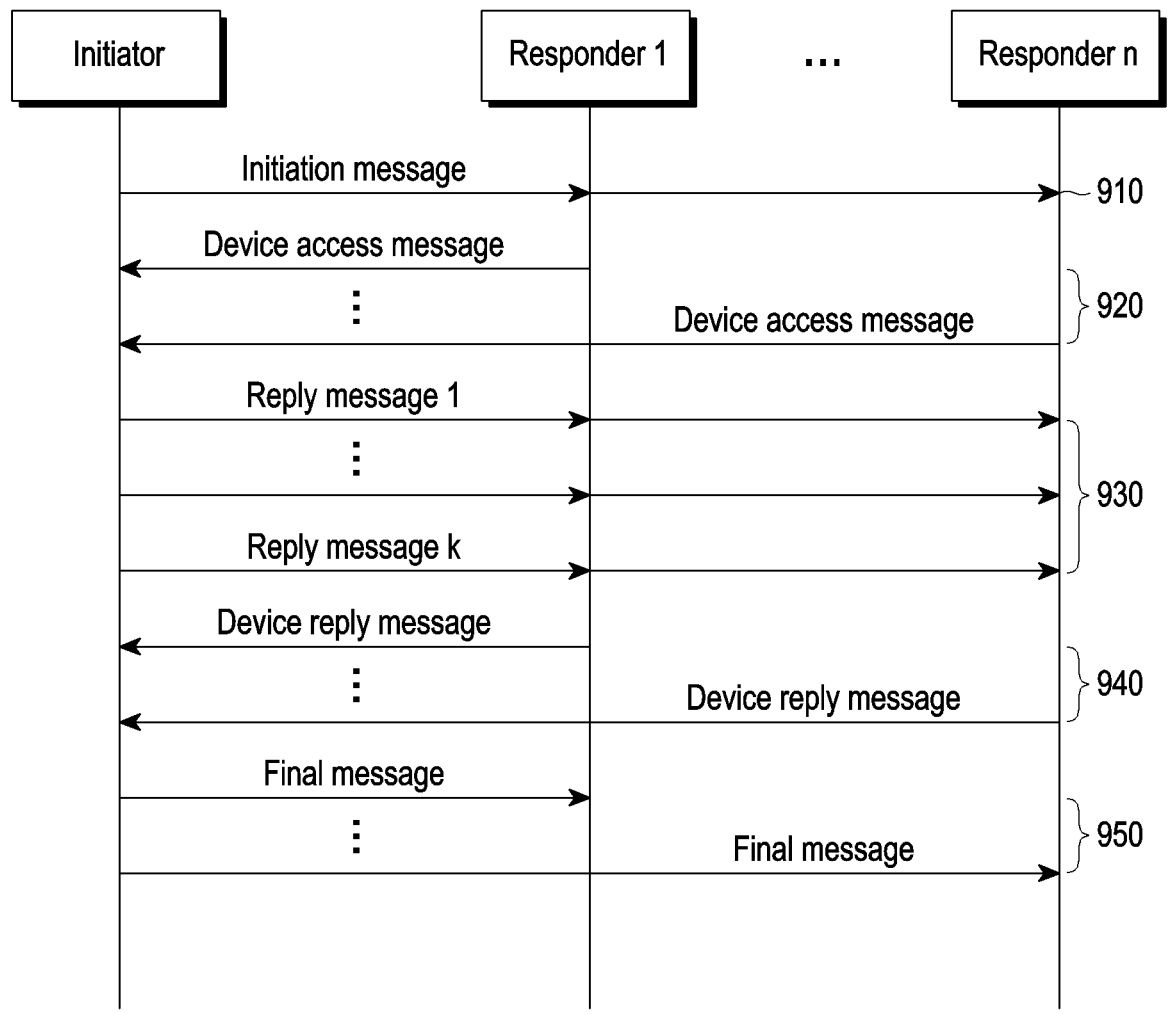
FIG. 9 illustrates a ranging procedure according to an embodiment.

FIG. 9 illustrates a ranging procedure according to an embodiment.

Referring to FIG. 9, the ranging procedure may be a ranging procedure (1:N ranging) between one initiator (e.g., a gate device or a PoS device) and n responders (e.g., the user's mobile device). The initiator may be referred to as a first UWB device, and the responder may be referred to as a second UWB device.

Each responder may participate in the ranging procedure through the above-described contention-based multiple access.

The structure of the ranging round used in the embodiment of FIG. 9 may include the ranging round structures of FIG. 7B or 7B.

The initiator (first UWB device) may include k anchors (UWB anchors (e.g., TDoA anchors) to identify the distance, direction, or location of the responder. In this case, one anchor may be a main anchor transmitting the TM, the first RM, and the FM, and the remaining anchors may be sub anchors transmitting their own RM instead of the first RM. The operation for each anchor may be referred to as the operation for the initiator.

In step 910, the initiator transmits an IM to the responder(s). The initiator or the main anchor of the initiator may broadcast the IM in the slot of the initiation phase. The initiator may initiate its own ranging round by transmitting this IM. The IM may include information about the contention period (competition period information) and/or status information about the slot included in the contention period (slot status information). For example, the IM may include information indicating the number of slots corresponding to the contention period and/or information indicating an access condition for each slot included in the contention period.

In step 920, the responder(s) transmit an AM (or a DAM) to the initiator. The responder(s) may transmit an AM to the initiator in any slot(s) within the contention period based on information included in the IM. The responder(s) receiving the IM may transmit the DAM to the initiator when a specific condition is met. For example, the responder(s) may transmit the DAM to the initiator when the distance from the initiator, obtained based on positioning is within a preset threshold. The responder may participate in contention in an empty slot. The empty slot may be a slot that has not been selected (reserved) by the gate/PoS device (initiator) in the previous block or a service protocol has been completed. If the AM transmitted by a specific responder is successfully received by the initiator within the contention period, the responder may become a candidate to perform the subsequent message exchange process.

In step 930, the initiator or each anchor of the initiator transmits a first RM to the responder(s). For example, the main anchor of the initiator may broadcast the first RM in the first slot of the first reply phase, and the remaining sub anchor(s) may broadcast their first RMs according to a predetermined order in the remaining slots of the first reply phase. The transmission order of the first RMs by the sub anchors may be determined by the initiator.

The first RM may include information about the result of contention in the DAM phase. The first RM may include ranging report information/message for DS-TWR. For example, the first RM may include ranging report information including a first round trip time field and/or a reply time list field for responder(s). The first round trip time field and/or the reply time list field may be exclusively included in the first RM transmitted by the main anchor of the initiator.

The first round trip time field may indicate the round-trip time between the IM and the first AM. In other words, the first round trip time field may indicate a time difference between the transmission time of the IM and the reception time of the first successfully received AM.

The reply time list field may include a list of reply times for responder(s). The list of reply times may include a list of reply times for each slot of the contention phase. The reply time may indicate the time taken to transmit the corresponding RM after successfully receiving the AM of the corresponding slot. In other words, the reply time for the responder may indicate a time difference between the reception time of the successful AM of the corresponding responder and the transmission time of the corresponding RM of the initiator. If the AM is not successfully received in the corresponding slot, the reply time may be set to zero.

For example, when the contention period includes three slots, the AM of responder #1 is successfully received in the first slot, no AM is successfully received in the second slot, and the AM of responder #2 is successfully received in the third slot, and the reply time list field is included in RM #1 of the initiator, the reply time list field may include a list of the time taken to transmit RM #1 of the initiator after receiving the AM of responder #1 (reply time for responder #1 (reply time #1)), the zero value (reply time #2), and the time taken to transmit RM #1 of the initiator after receiving the AM of responder #2 (reply time for responder #2 (reply time #3)).

The ranging report information/message included in the first RM may be referred to as first measurement report information/message.

When the first RM is received, the responder may obtain a distance between the initiator (e.g., the initiator's main anchor) and the responder by performing DS-TWR based on the IM, the AM, and the RM. The responder may determine whether to transmit the second RM in the second reply phase, based on the obtained distance.

As in FIG. 7B, the period of the contention phase and the period of the second reply phase may be different. In this case, the initiator should provide information about the time of the second reply phase through the first RM. For example, the first RM may further include information indicating the number of slots included in the second reply phase. Thus, the responder may identify the period of the second reply phase and, based thereupon, transmit the second RM to the initiator.

In step 940, the responder(s) transmit a second RM to the initiator. For example, based on the information included in the first RM and the result of UWB ranging based on DS-TSR, the responder may transmit the second RM to the initiator in the corresponding slot of the second reply phase.

The second RM may include information (identification information) for identifying the responder. The identification information is information used only in a specific session and may be changed whenever the service is restarted.

The second RM may include ranging report information/message for DS-TWR. For example, the second RM may include ranging report information including a first round trip time field and/or a reply time list field for the initiator. The first round trip time field and/or the reply time list field may be included in the second RM transmitted by each responder.

The first round trip time field may indicate the round-trip time between the AM transmitted by itself and the first RM of the initiator. In other words, the first round trip time field may indicate a time difference between the transmission time of the AM transmitted by the corresponding responder and the reception time of the first received RM of the initiator (e.g., the initiator's main anchor).

The reply time list field may include a list of reply times for the initiator or each anchor of the initiator. The list of reply times may include a list of reply times for each slot of the first reply phase. The reply time may indicate the time taken to transmit the RM of the corresponding responder after receiving the RM of the initiator or the anchor of the initiator of the corresponding slot. In other words, the reply time for the initiator may indicate a time difference between the reception time of the RM of the corresponding initiator and the transmission time of the corresponding RM of the responder.

For example, when the first reply phase includes two slots, RM #1 of anchor #1 (main anchor) of the initiator is received in the first slot, and RM #2 of anchor #2 (sub anchor) of the initiator is received in the second slot, and the reply time list field is included in RM #1 of responder #1, the reply time list field may include a list of the time taken to transmit RM #1 of responder #1 after receiving RM #1 of anchor #1 (reply time for the RM of anchor #1 (reply time #1)) and the time taken to transmit RM #1 of responder #1 after receiving RM #1 of anchor #2 (reply time for the RM of anchor #2 (reply time #2)).

The ranging report information/message included in the second RM may be referred to as second measurement report information/message.

When the second RM is received, the initiator (or each anchor of the initiator) may obtain the distance between the initiator (or each anchor) and the responder by performing DS-TWR based on the AM, the first RM, and the second RM. The initiator may decide whether to transmit an FM in the final phase based on the obtained distance.

In step 950, the initiator transmits the FM to the responder(s). When the initiator successfully receives the second RM from the responder, the initiator may transmit the FM to the corresponding mobile device. For example, based on the information included in the second RM and the UWB ranging result based on DS-TWR, the initiator may transmit an FM to each responder in each slot of the final phase.

If a message exchange is confirmed by the initiator through the FM, the slot used by the responder may be allocated to the responder according to a specific condition. Accordingly, the corresponding slot may be reserved as a slot available only to the corresponding responder in the corresponding round of the later ranging block.

The IM, AM, first RM, second RM, and/or FM used in the ranging procedure of FIG. 9 may be an RFRAME (SP1 RFRAME) having the above-described SP1 packet configuration.

The IM and RM may be broadcasting messages, and the DAM, DRM, and FM may be unicast messages transmitted to a specific target. The unicast message may include data for a service protocol (e.g., payment). If the service protocol is not terminated in the corresponding gate round, the remaining procedures may be processed in the next gate round (e.g., the gate round for the corresponding gate in the next block). In this case, a slot for the mobile device may be reserved for the next gate round, and the reserved slot may be marked as an occupied slot in the IM transmitted in the next gate round.

FIG. 10 illustrates an IM according to an embodiment.

Referring to FIG. 10, the IM includes information about the length of the contention period (competition period length information) and information about the status (or, state) of the slot included in the contention period (slot status information).

The contention period may be started immediately after the initiation phase, and the length of the contention period may be expressed as the number of slots (slot length). For example, the contention period length information may be information indicating the number of slots included in the contention period.

The slot status information may represent an access condition for each slot included in the contention period in a predetermined expression scheme.

The slot status information may express/represent the access condition for each slot as a bitmask. In this case, only whether the corresponding slot is available may be indicated through the slot status information. For example, when the slot status information has a value of 0b1100, the slot status information may indicate that the first and second slots are allocated (reserved) to other responders and thus unavailable while the third and fourth slots are available. In this case, the responder may not attempt access to the initiator in the first and second slots and may attempt access in the third and fourth slots.

As another example, the slot status information may express/represent the access condition for each slot as a level. In this case, a condition corresponding to a predefined level for the corresponding slot may be indicated through the slot status information. When the value of the corresponding slot in the slot status information is 0x00, it may indicate that the access condition for the corresponding slot corresponds to no restriction (e.g., no restriction on access by device (that is, all devices may attempt access)). Alternatively, if the value of the corresponding slot of the slot status information is 0x01, it may indicate that the level of the access condition for the corresponding slot corresponds to level 1 (e.g., a level where only devices within 20 cm (distance from the initiator) may gain access). If the value of the corresponding slot of the slot status information is 0x02, it may indicate that the level of the access condition for the corresponding slot corresponds to level 2 (e.g., a level where only devices within 10 cm (distance from the initiator) may gain access).

As another example, the slot status information may express/represent the access condition for each slot as an actually used value. In this case, an actual condition value for the corresponding slot may be indicated through the slot status information. When the value of the corresponding slot in the slot status information is 0x00, it may indicate that the access condition for the corresponding slot corresponds to no restriction (e.g., no restriction on access by device). Alternatively, if the value of the corresponding slot of the slot status information is 0x0A, it may indicate that the access condition for the corresponding slot corresponds to only devices within 10 cm from the initiator being able to gain access. If the value of the corresponding slot of the slot status information is 0x14, it may indicate that the access condition for the corresponding slot corresponds to only devices within 20 cm from the initiator being able to gain access.

The initiator may select one of the above-described schemes, as the representation scheme of the slot status information, according to the size of data available for the slot status information.

The initiator provides slot status information and/or contention period length information through the IM as illustrated in FIG. 10 in each round before the contention phase. Thus, it is possible to adaptively change the length of the contention period and/or the access condition per round or per block.

FIG. 11 illustrates slot status information of an IM according to an embodiment.

Referring to FIG. 11, the slot status information may express the access condition of each slot as a bitmask.

The slot status information may be reserved by a predetermined length of bytes (or bits) (e.g., 2 bytes). However, only a number of bits corresponding to the value set is in the contention period length information preceding the slot status information may be used to indicate the actual slot status.

When the value set in the contention period length information is 0x04, only a number of bits (4 bits) corresponding to the slot length from a least significant bit (LSB) may be used to indicate the slot status. In this case, the first bit (or the last bit) among bits indicating the slot status may be used to indicate the slot status for the first slot, and the last bit (or the first bit) may be used to indicate the slot status for the last slot.

Hereinafter, various embodiments of adaptively changing the length and/or access condition of the next contention period based on a success rate in the previous contention period are described. Here, the success rate may be a rate of slots of success in competition in the contention period. For example, the success rate may be a ratio of the number of slots in which the AM has been successfully received from the responder to the total number of slots included in the contention period.

1. Adaptively Changing a Length and Access Conditions of a Next Contention Period Together Based on a Success Rate of a Previous Contention Period In a case in which one block consists of one round, e.g., as shown in structure (a) of FIG. 7A, the initiator may change the number of slots included in the contention period of the next block (round) and access conditions together according to the success rate of the previous block (round). For example, if the contention period of the previous block (round) includes 5 slots, but an AM is not successfully received due to a collision in 4 slots, the initiator may set the contention period of the next block (round) to include 10 slots. In this case, the access condition for the newly added 5 slots may be different from the access condition for the existing 5 slots. For the existing slots, access is not limited by the number of access attempts and, for the newly added slots, access may be limited by the number of access attempts. For the newly added slots, a restriction may be imposed so that only responders that have attempted access two times or more may transmit an AM to the initiator.

Thus, it is possible to more efficiently provide a service using limited resources by changing the slot status information and length of the contention period of the block (round) according to the success rate of access. However, when the contention period is always set to be long, a delay may occur in message exchange. Therefore, the competition period may be temporarily lengthened when necessary. For example, when the success rate of access increases again, the delay may be reduced by adjusting the contention period to be shorter again.

FIGS. 12A and 12B illustrates a method for adjusting a length and access condition of a contention period using an IM according to an embodiment. For example, the IM of FIG. 12 may be an IM including slot status information expressing an access condition for each slot as a level.

Referring to FIG. 12A, the slot status information may include a list of access conditions. Each list element has a size of 1 byte, and each byte may indicate a previously defined level of access condition. For example, the list element set to 0x00 may indicate level 0 (e.g., no access restriction), the list element set to 0x01 may indicate level 1 (e.g., only devices that have attempted access 2 times or more may attempt access), and the list element set to 0x02 may indicate level 2 (e.g., only devices that have attempted access 5 times or more may attempt access).

The IM of FIG. 12A corresponds to the IM used in the first block (round), and the IM of FIG. 12B corresponds to the IM used in the second block (round) immediately following the first block (round).

Referring to FIG. 12A, the IM for the first block (round) may include contention period length information set to 0x05 and slot status information set to {0x00, 0x00, 0x00, 0x00, 0x00}. Thus, it may be indicated that the number of slots included in the contention period is five (5) and that the access condition for each slot is not limited.

When the length of the contention period and access condition for the next block (round) is to be changed, the initiator may newly configure an IM of the next block (round). For example, the initiator may newly configure the IM of FIG. 12A as the IM of FIG. 12B.

Referring to FIG. 12B, the IM for the second block (round) may include contention period information set to 0x0A and slot status information set to {0x02, 0x02, 0x02, 0x01, 0x01, 0x00, 0x00, 0x00, 0x00, 0x00}. Thus, it may be indicated that the number of slots included in the contention period has been adjusted from 5 to 10, the first, second, and third slots of the contention phase (period) have the access condition of level 2, and the fourth and fifth slots have the access condition of level 1, and the remaining slots have no access restriction. Alternatively, it may be indicated that the number of slots included in the contention period has been adjusted from 5 to 10, and the first to fifth slots of the contention phase (period) have no access restriction, and the sixth and seventh slots have the access condition of level 1, and the seventh to tenth slots have the access condition of level 2.

As described above, through the newly configured IM, the length of the contention period may be increased, and access conditions for the newly added slots may be set to differ from the access conditions for the existing slots. In this case, the access success rate may be increased compared to the existing one.

In FIGS. 12A and 12B, a method for adaptively changing the access condition and length of contention period has been described using a scheme of expressing the slot status information of the IM as a level. However, this is merely an example, and it will be appreciated by one of ordinary skill in the art that it is possible to adaptively change the access condition and length of contention period in the same method even in the case of using slot status information expressed in a different manner (e.g., a scheme of expressing the slot status information as the bitmask of FIG. 10 or an actually used value).

2. Adaptively Changing Only the Access Conditions of the Next Contention Period Based on the Success Rate of the Previous Contention Period In a case in which one block consists of a plurality of rounds, e.g., as shown in structure (b) of FIG. 7A, since it is impossible to adaptively change the structure of the block (round), the length of the contention period cannot be adaptively changed, but access conditions may be adaptively changed.

More specifically, the initiator may change the access conditions for the slots included in the contention period of the next block (round) according to the success rate of the previous block (round). For example, if the contention period of the previous block (round) includes five (5) slots, but an AM is not successfully received due to a collision in four (4) slots, the initiator may set the access conditions for the five slots included in the contention period of the next block (round) to differ from the access conditions for the five slots included in the contention period of the previous/existing block (round).

For example, in the existing block (round), the access condition of each of the five slots imposes a limitation so that only devices within 30 cm may gain access but, in the next block (round), the access condition for two slots imposes a limitation so that only devices within 10 cm may gain access, the access condition for other two slots imposes a limitation so that only devices within 20 cm may gain access, and the access condition for the remaining one slot imposes a limitation so that only devices within 30 cm may gain access like previous. Thus, even when there is no increase in the number of contention periods, the access success rate may be increased by adjusting the access conditions.

Thus, it is possible to more efficiently provide a service using limited resources by changing the slot status information and length of the contention period of the block (round) according to the success rate of access.

FIGS. 13A and 13B illustrate a method for adjusting an access condition using an IM according to an embodiment. For example, the IM of FIG. 13 may be an IM including slot status information expressing an access condition for each slot as an actually used value.

Referring to FIG. 13A, the slot status information may include a list of access conditions. Each list element has a size of 1 byte, and each byte may indicate a previously defined actual value of access condition. For example, the list element set to 0x00 may indicate that there is no access restriction, the list element set to 0x32 may indicate that only devices for which the distance from the device sending the message (IM) may be specified as within 50 cm may attempt access, the list element set to 0x1E may indicate that only devices for which the distance from the device sending the message may be specified as within 30 cm may attempt access, and the list element set to 0x0A may indicate that only devices for which the distance from the device sending the message may be specified as within 10 cm may attempt access.

The IM of FIG. 13A corresponds to the IM used in the first block (round), and the IM of FIG. 13B corresponds to the IM used in the second block (round) immediately following the first block (round).

Referring to FIG. 13A, the IM for the first block (round) may include contention period length information set to 0x05 and slot status information set to {0x00, 0x00, 0x00, 0x00, 0x00}. Thus, it may be indicated that the number of slots included in the contention period is five (5) and that the access condition for each slot is not limited.

When the length of the contention period and access condition for the next block need to be changed, the initiator may newly configure an IM of the next block. For example, the initiator may newly configure the IM of FIG. 13A as the IM of FIG. 13B.

Referring to FIG. 13B, the IM for the second block (round) may include contention period information set to 0x05 and slot status information set to {0x0A, 0x0A, 0x1E, 0x1E, 0x32}. Thus, the number of slots included in the contention period remains unchanged as five. The first and second slots of the contention phase (period) may have an access condition indicating no restriction, the third and fourth slots may have an access condition indicating that only devices for which the distance from the device sending the message may be specified as within 30 cm may attempt access, and the fifth slot may have an access condition indicating that only devices for which the distance from the device sending the message may be specified as within 50 cm may attempt access.

Alternatively, the number of slots included in the contention period remains unchanged as five. The first slot of the contention phase (period) may have an access condition indicating that only devices for which the distance from the device sending the message may be specified as within 50 cm may attempt access. The second and third slots may have an access condition indicating that only devices for which the distance from the device sending the message may be specified as within 30 cm may attempt access. The fourth and fifth slots may have an access condition indicating no restriction.

In FIGS. 13A and 13B, a method for adaptively changing the access condition has been described using a scheme of expressing the slot status information of the IM as an actually used value. However, this is merely an example, and it will be appreciated by one of ordinary skill in the art that it is possible to adaptively change the access condition in the same method even in the case of using slot status information expressed in a different manner a scheme of expressing the slot status information as the bitmask of FIG. 10 or level).

Figure 14:
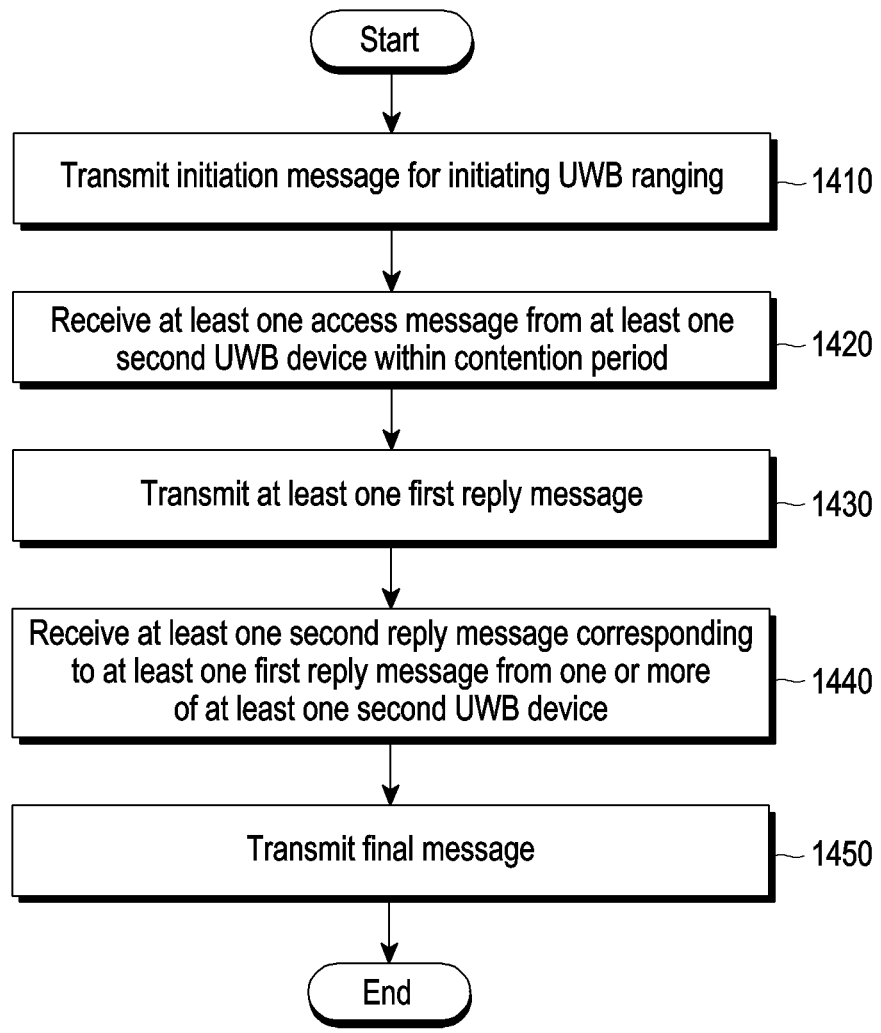
FIG. 14 is a flowchart illustrating a method of a first UWB device according to an embodiment.

FIG. 14 is a flowchart illustrating a method of a first UWB device according to an embodiment.

Referring to FIG. 14, the first UWB device may be the initiator (e.g., a gate device or a PoS device), and the second UWB device may be the responder (e.g., a user's mobile device).

Referring to FIG. 14, in step 1410, the first UWB device transmits an IM for initiating UWB ranging.

In step 1420, the first UWB device receives at least one AM from the at least one second UWB device within the contention period.

In step 1430, the first UWB device transmits at least one first RM.

In step 1440, the first UWB device receives at least one second RM corresponding to the at least one first RM from one or more of the at least one second UWB device.

In step 1450, the first UWB device transmits an FM.

The IM may include information about the length of the contention period and information about the status of the ranging slot included in the contention period.

The information about the status of the ranging slot included in the contention period may include information expressing the access condition for each slot included in the contention period as a bitmask, information expressing the access condition for each slot included in the contention period as a predefined level, and information expressing the access condition for each slot in the contention period as an actually used value.

The structure of the ranging block/ranging round used in the method for FIG. 14 may follow the structure of the ranging block/ranging round of FIGS. 7A and 7B.

The first UWB device may adjust at least one of information about the length of the contention period and the status of the ranging slot included in the contention period based on the success rate of access in the contention period in the previous ranging block or round. Adjustment of contention period length slot status information may follow the description of FIGS. 12 to 13.

A first message among the at least one first RM may include information indicating a second reply period for the at least one second RM, and the at least one second RM may be received within the second reply period.

The first message may include a first round trip time field indicating the time difference between the IM and the AM successfully received for the first time among at least one AM and a reply time list field for at least one second UWB device.

The first message may be transmitted by the main anchor of the first UWB device transmitting the IM.

At least one second RM may include a first round trip time field indicating the time difference between the corresponding AM and the first RM received for the first time among at least one first RM and a reply time list field for the UWB device.

The first UWB device may perform the first UWB ranging by DS-TWR based on the AM, the first RM, and the second RM, and the second UWB device may perform the second UWB ranging by DS-TSR based on the IM, the connection message, and the second RM.

The second RM may be transmitted based on the result of the first UWB ranging, and the FM may be transmitted based on the result of the second UWB ranging.

Figure 15:
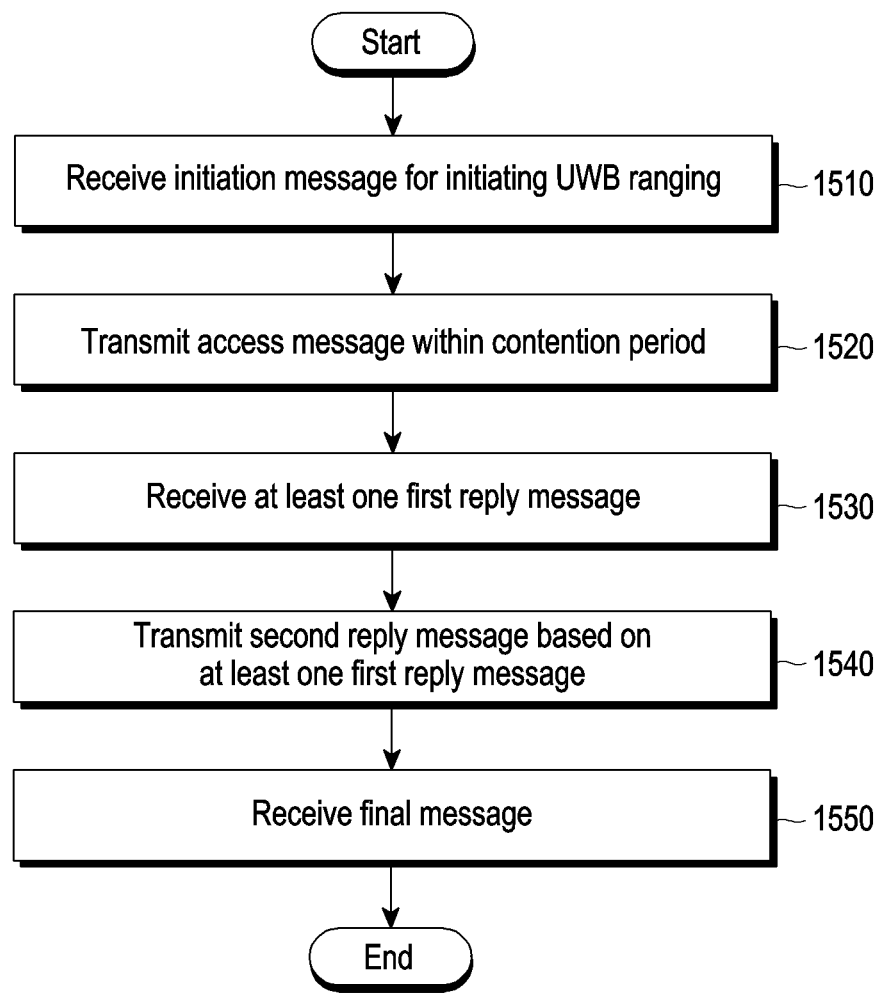
FIG. 15 is a flowchart illustrating a method of a second UWB device according to an embodiment.

FIG. 15 is a flowchart illustrating a method of a second UWB device according to an embodiment.

Referring to FIG. 15, the first UWB device may be the initiator (e.g., a gate device or a PoS device), and the second UWB device may be the responder (e.g., a user's mobile device).

In step 1510, the second UWB device receives an IM for initiating UWB ranging from the first UWB device.

In step 1520, the second UWB device transmits an AM to the first UWB device within the contention period.

In step 1530, the second UWB device receives at least one first RM from the first UWB device.

In step 1540, the second UWB device transmits a second RM based on at least one first RM to the first UWB device.

In step 1550, the second UWB device receives an FM from the first UWB device.

The IM may include information about the length of the contention period and information about the status of the ranging slot included in the contention period.

The information about the status of the ranging slot included in the contention period may include information expressing the access condition for each slot included in the contention period as a bitmask, information expressing the access condition for each slot included in the contention period as a predefined level, and information expressing the access condition for each slot in the contention period as an actually used value.

The structure of the ranging block/ranging round used in the method for FIG. 15 may follow the structure of the ranging block/ranging round of FIGS. 7A and 7B.

The first UWB device may adjust at least one of information about the length of the contention period and the status of the ranging slot included in the contention period based on the success rate of access in the contention period in the previous ranging block or round. Adjustment of contention period length slot status information may follow the description of FIGS. 11 to 12.

A first message among the at least one first RM may include information indicating a second reply period for the at least one second RM, and the at least one second RM may be received within the second reply period.

The first message may include a first round trip time field indicating the time difference between the IM and the AM successfully received for the first time among at least one AM and a reply time list field for at least one second UWB device.

The first message may be transmitted by the main anchor of the first UWB device transmitting the IM.

At least one second RM may include a first round trip time field indicating the time difference between the corresponding AM and the first RM received for the first time among at least one first RM and a reply time list field for the UWB device.

The first UWB device may perform the first UWB ranging by DS-TWR based on the AM, the first RM, and the second RM, and the second UWB device may perform the second UWB ranging by DS-TWR based on the IM, the connection message, and the second RM.

The second RM may be transmitted based on the result of the first UWB ranging, and the FM may be transmitted based on the result of the second UWB ranging.

Figure 16:
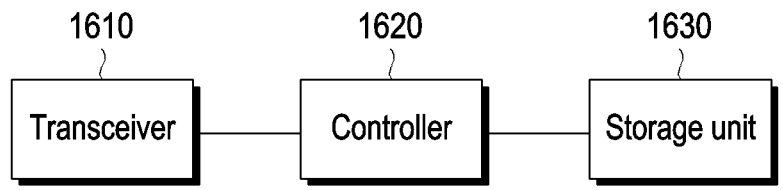
FIG. 16 illustrates an electronic device according to an embodiment.

FIG. 16 illustrates an electronic device according to an embodiment. For example, the electronic device may correspond to a UWB device, include a UWB device, or may be an electronic device that may include a portion of a UWB device.

Referring to FIG. 16, the electronic device includes a transceiver 1610, a controller 1620, and a storage unit 1630. The controller may be defined as a circuit, an ASIC, and/or at least one processor.

The transceiver 1610 may transmit and receive signals to/from another entity. The transceiver 1610 may transmit/receive data to/from another device through, e.g., UWB communication and/or OOB communication (e.g., BLE).

The controller 1620 may control the overall operation of the electronic device according to an embodiment. The controller 1620 may control inter-block signal flow to perform the operations according to the above-described flowchart. Specifically, the controller 1620 may control the operations (e.g., the operations of the application and/or framework) of the electronic device described above with reference to FIGS. 1 to 15.

The storage unit 1630 may store at least one of information transmitted/received via the transceiver 1610 and information generated via the controller 1620. For example, the storage unit 1630 may store information and data necessary for the method described above with reference to FIGS. 1 to 15. The storage unit 1630 may include a memory device. In an embodiment, the storage unit 1630 may include the above-described secure component.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

In view of the above-described embodiments, it is possible to support efficient contention-based multiple access by using a method for adaptively adjusting a contention period and access condition for contention-based multiple access of the disclosure.

It is also possible to provide an efficient UWB service by using a method for providing bi-directional ranging of the disclosure.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method by a first ultra-wide band (UWB) device, the method comprising:
   transmitting an initiation message (IM) for initiating UWB ranging in a first period of a first ranging round;
   receiving an access message (AM) from a second UWB device in a second period of the first ranging round, the second period being a contention period used for a contention-based access;
   transmitting a first reply message (RM) in a third period of the first ranging round, wherein the first RM includes information indicating a fourth period for the second RM; and
   receiving a second RM corresponding to the first RM from the second UWB device in the fourth period of the first ranging round,
   wherein the IM includes length information about a length of the contention period and slot status information about a status of a ranging slot included in the contention period.

2. The method of claim 1, wherein the slot status information includes information representing an access condition for each slot included in the contention period as a bitmask, information representing the access condition for each slot included in the contention period as a predefined level, or information representing the access condition for each slot in the contention period as an actually used value.

3. The method of claim 1, wherein a number of slots included in the second period is equal to a number of slots included in the fourth period.

4. The method of claim 1, wherein the first UWB device adjusts at least one of the length information and the slot status information for a second ranging round following the first ranging round, based on a success rate of access in the contention period in the first ranging round.

5. The method of claim 1, wherein the first RM includes a first round trip time field indicating a time difference between the IM and the AM and a reply time list field for the second UWB device.

6. The method of claim 5, wherein the first RM is transmitted by a main anchor of the first UWB device transmitting the IM.

7. The method of claim 1, wherein the second RM includes a first round trip time field indicating a time difference between a corresponding access message and a first reply message received first among the first RM and a reply time list field for the second UWB device.

8. The method of claim 1, wherein the first UWB device performs first UWB ranging by double-sided two-way ranging (DS-TWR) based on the AM, the first RM, and the second RM, and
   wherein the second UWB device performs second UWB ranging by DS-TWR based on the IM, the AM, and the second RM.

9. The method of claim 8, further comprising transmitting a final message (FM) based on a result of the second UWB ranging.

10. A method by a second ultra-wide band (UWB) device, the method comprising:
    receiving an initiation message (IM) for initiating UWB ranging from a first UWB device in a first period of a first ranging round;
    transmitting an access message (AM) to the first UWB device in a second period of the first ranging round, the second period being a contention period used for a contention-based access;
    receiving a first reply message (RM) from the first UWB device in a third period of the first ranging round, wherein the first RM includes information indicating a fourth period for the second RM; and
    transmitting, to the first UWB device, a second RM based on the first RM in the fourth period of the first ranging round; and
    receiving a final message (FM) from the first UWB device,
    wherein the IM includes length information about a length of the contention period and slot status information about a state of a ranging slot included in the contention period.

11. The method of claim 10, wherein the slot status information includes information representing an access condition for each slot included in the contention period as a bitmask, information representing the access condition for each slot included in the contention period as a predefined level, or information representing the access condition for each slot in the contention period as an actually used value.

12. The method of claim 10, wherein a number of slots included in the second period is equal to a number of slots included in the fourth period.

13. The method of claim 10, wherein the first UWB device adjusts at least one of the length information and the slot status information for a second ranging round following the first ranging round, based on a success rate of access in the contention period in the first ranging round.

14. The method of claim 10, wherein the first RM includes a first round trip time field indicating a time difference between the IM and the AM and a reply time list field for the second UWB device.

15. The method of claim 14, wherein the first RM is transmitted by a main anchor of the first UWB device transmitting the IM.

16. The method of claim 10, wherein the second RM includes a first round trip time field indicating a time difference between a corresponding access message and a first reply message received first among the first RM and a reply time list field for the second UWB device.

17. The method of claim 10, wherein the first UWB device performs first UWB ranging by double-sided two-way ranging (DS-TWR) based on the AM, the first RM, and the second RM, and
wherein the second UWB device performs second UWB ranging by DS-TWR based on the IM, the AM, and the second RM.

18. The method of claim 17, further comprising receiving a final message (FM) based on a result of the second UWB ranging.

19. A first ultra-wide band (UWB) device, the first UWB device comprising:
a transceiver; and
a controller coupled with the transceiver and configured to control to:
transmit an initiation message (IM) for initiating UWB ranging in a first period of a first ranging round,
receive an access message (AM) from a second UWB device in a second period of the first ranging round, the second period being a contention period used for a contention-based access,
transmit a first reply message (RM) in a third period of the first ranging round, wherein the first RM includes information indicating a fourth period for the second RM, and
receive a second RM corresponding to the first RM from the second UWB device in the fourth period of the first ranging round,
wherein the IM includes length information about a length of the contention period and slot status information about a status of a ranging slot included in the contention period.

20. A second ultra-wide band (UWB) device, the second UWB device comprising:
a transceiver; and
a controller coupled with the transceiver and configured to control to:
receive an initiation message (IM) for initiating UWB ranging from a first UWB device in a first period of a first ranging round,
transmit an access message (AM) to the first UWB device in a second period of the first ranging round, the second period being a contention period used for a contention-based access,
receive a first reply message (RM) from the first UWB device in a third period of the first ranging round, wherein the first RM includes information indicating a fourth period for the second RM,
transmit, to the first UWB device, a second RM based on the first RM in the fourth period of the first ranging round, and
receive a final message (FM) from the first UWB device,
wherein the IM includes length information about a length of the contention period and slot status information about a state of a ranging slot included in the contention period.

* * * * *